(12) United States Patent
Taniguchi

(10) Patent No.: US 11,081,908 B2
(45) Date of Patent: Aug. 3, 2021

(54) ELECTRONIC APPARATUS AND METHOD

(71) Applicant: KABUSHIKI KAISHA TOSHIBA, Tokyo (JP)

(72) Inventor: Kentaro Taniguchi, Kawasaki Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 154 days.

(21) Appl. No.: 16/556,543

(22) Filed: Aug. 30, 2019

(65) Prior Publication Data

US 2020/0185975 A1 Jun. 11, 2020

(30) Foreign Application Priority Data

Dec. 5, 2018 (JP) .............................. JP2018-228316

(51) Int. Cl.
*H02J 50/60* (2016.01)
*H02P 29/40* (2016.01)
*H02J 50/80* (2016.01)

(52) U.S. Cl.
CPC .............. *H02J 50/60* (2016.02); *H02J 50/80* (2016.02); *H02P 29/40* (2016.02)

(58) Field of Classification Search
None
See application file for complete search history.

(56) References Cited

U.S. PATENT DOCUMENTS 9,337,943 B2 * 5/2016 Mosebrook ....... H02J 13/00022
9,473,207 B2 * 10/2016 McCormack .......... H02J 7/025
10,008,887 B2 * 6/2018 Zeine .................... H02J 7/0047
2015/0349543 A1   12/2015 Sakata et al.
2016/0065005 A1 * 3/2016 Won ....................... H02J 50/10
                                                         307/104
2020/0076239 A1   3/2020 Taniguchi et al.
2020/0076241 A1   3/2020 Tandai et al.

FOREIGN PATENT DOCUMENTS

| JP | 2016007117 A | 1/2016 |
| JP | 2017022876 A | 1/2017 |
| JP | 2020036519   | 3/2020 |
| JP | 2020039216   | 3/2020 |

OTHER PUBLICATIONS

U.S. Appl. No. 16/299,102, filed Mar. 11, 2019, First Named Inventor: Kentaro Taniguchi, Title: Electronic Apparatus.
U.S. Appl. No. 16/299,479, filed Mar. 12, 2019, First Named Inventor: Tomoya Tandai, Title: Electronic Apparatus and Method.

* cited by examiner

*Primary Examiner* — Jared Fureman
*Assistant Examiner* — Joel Barnett
(74) *Attorney, Agent, or Firm* — Holtz, Holtz & Volek PC

(57) ABSTRACT

According to one embodiment, transmission circuitry transmits power with a first electromagnetic wave in a first frequency band. A processor circuitry executes a carrier sense during a first period, in at least a second frequency band different from the first frequency band. The transmission circuitry transmits power with a second electromagnetic wave in the first frequency band in a second period following the first period, if a wireless signal is not detected by the carrier sense during the first period. The processor circuitry executes the carrier sense during a third period following the first period in the at least the second frequency band, if the wireless signal is detected by the carrier sense during the first period.

15 Claims, 22 Drawing Sheets

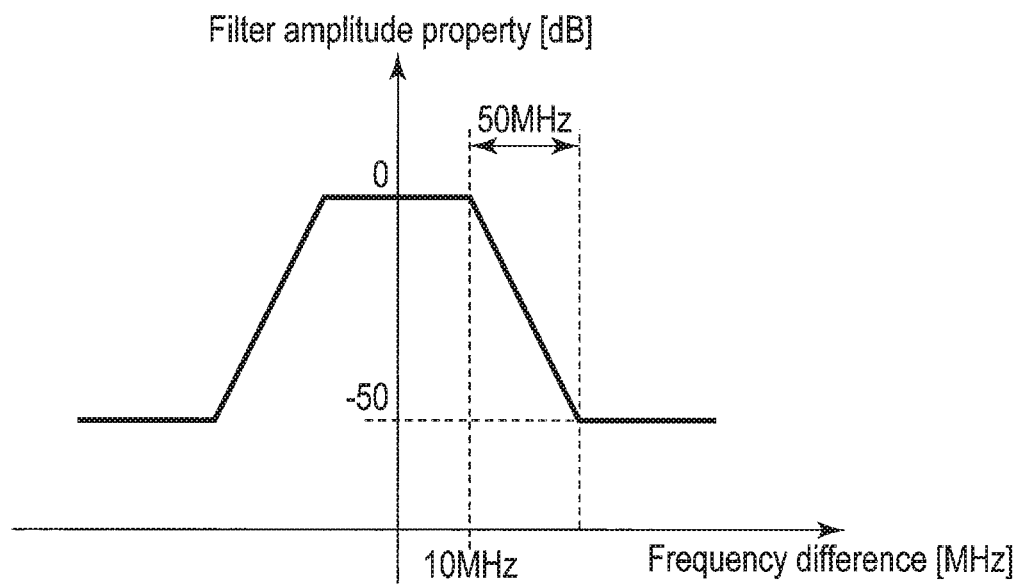
F I G. 7
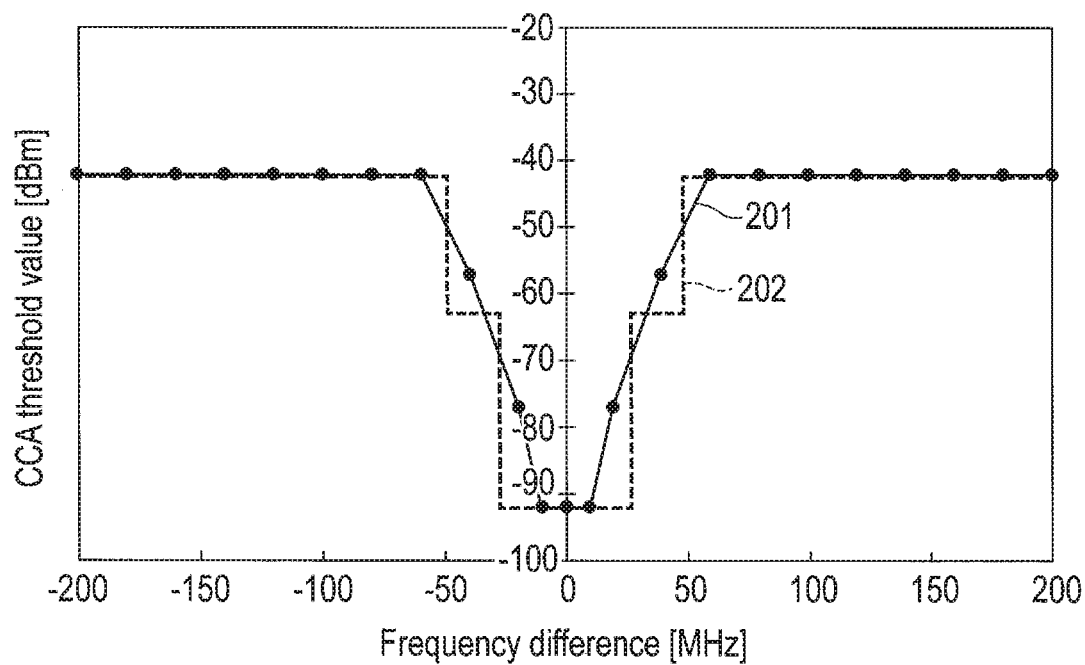
F I G. 8

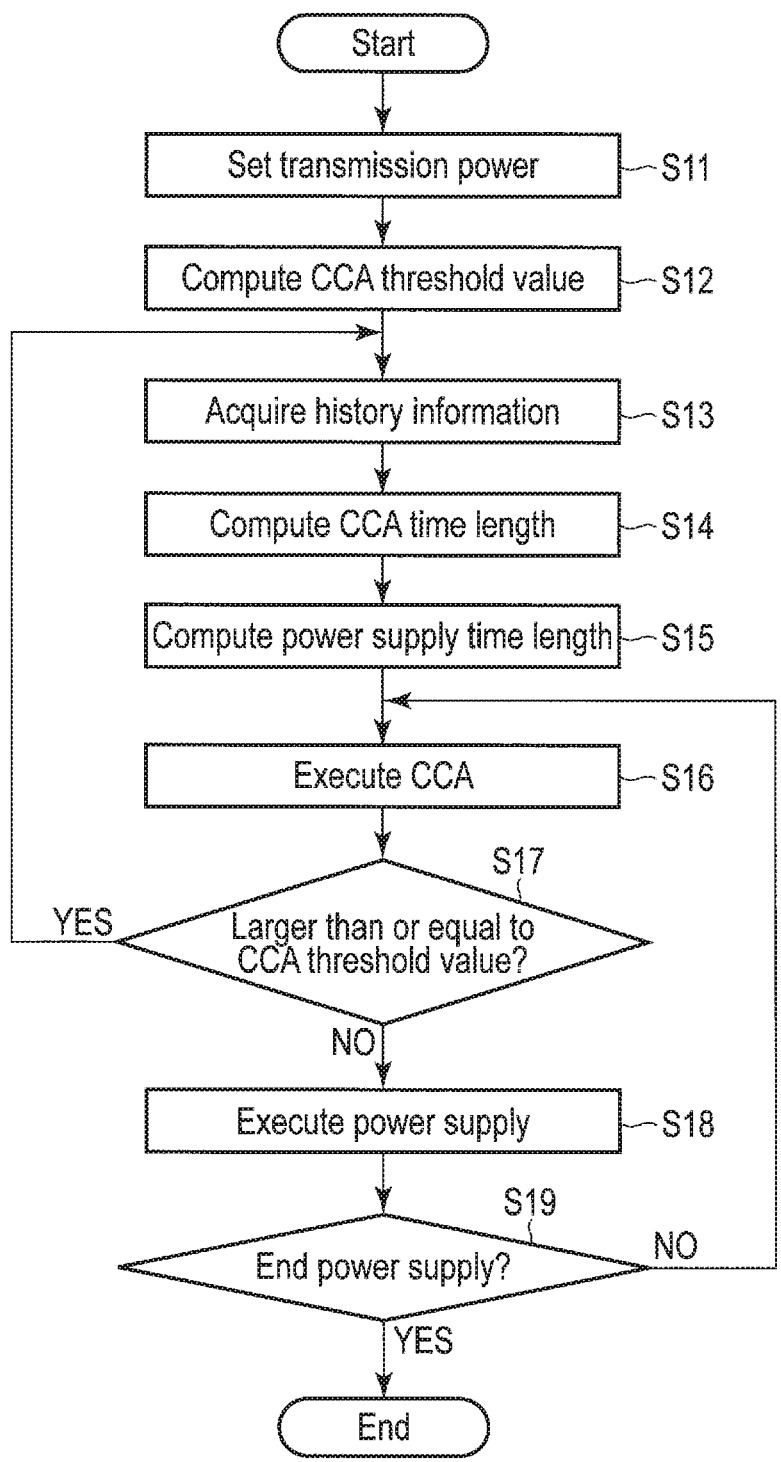
F I G. 12

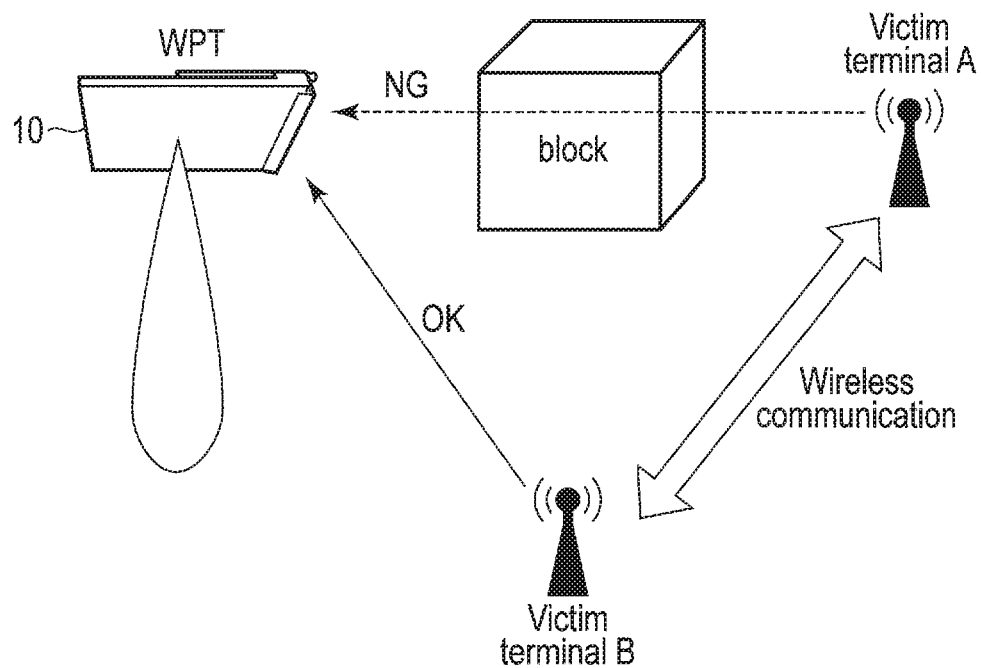
F I G. 14
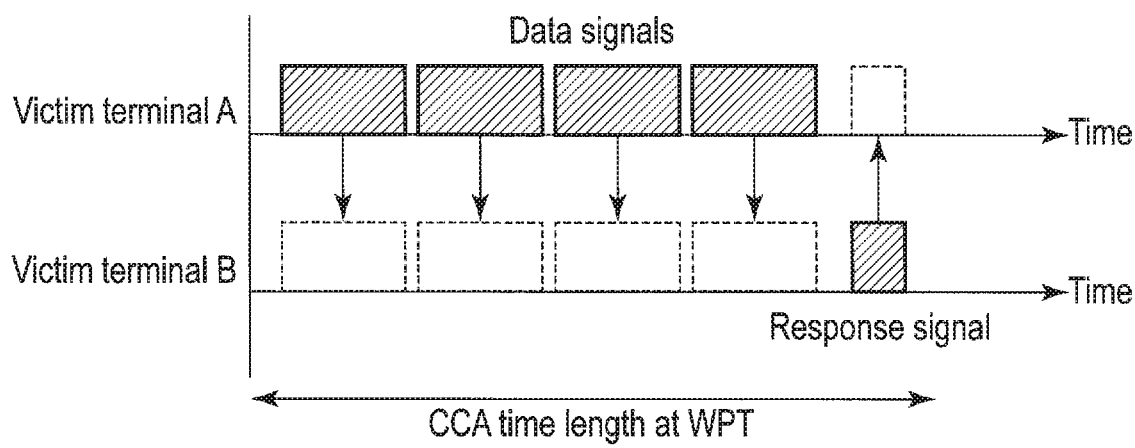
F I G. 15

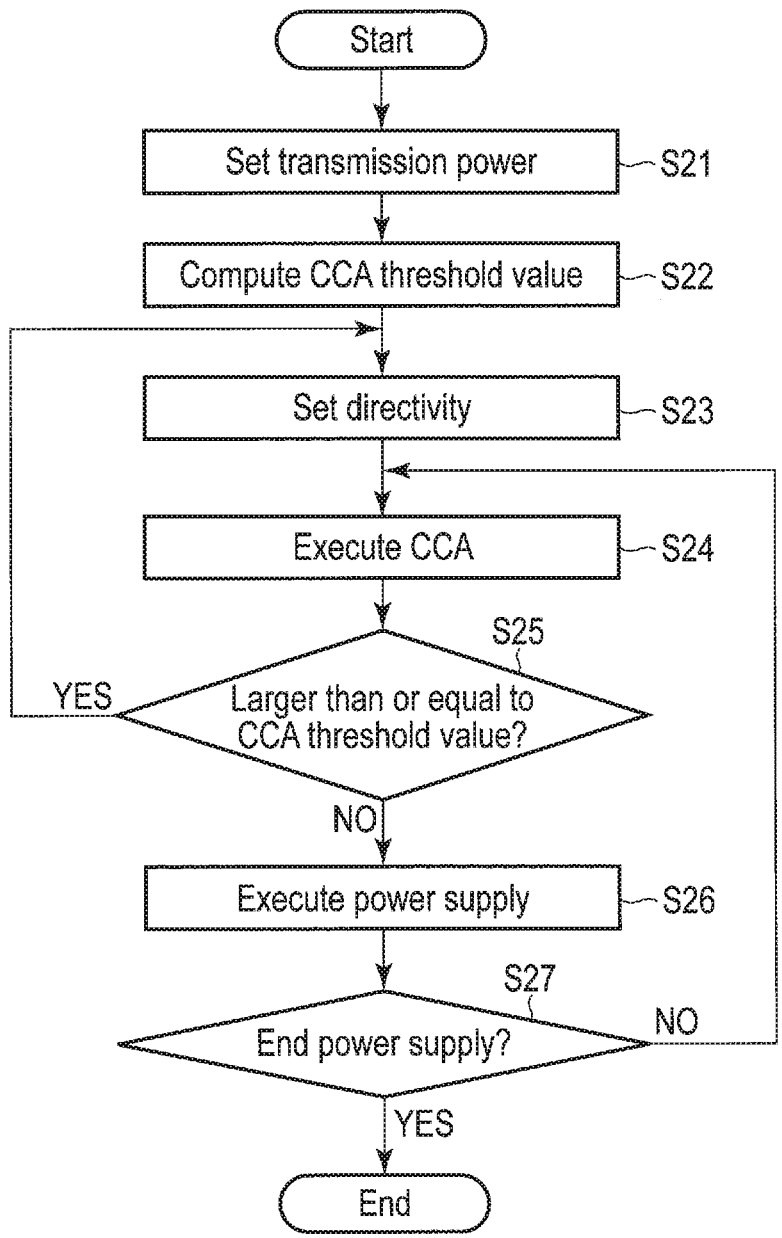
F I G. 16

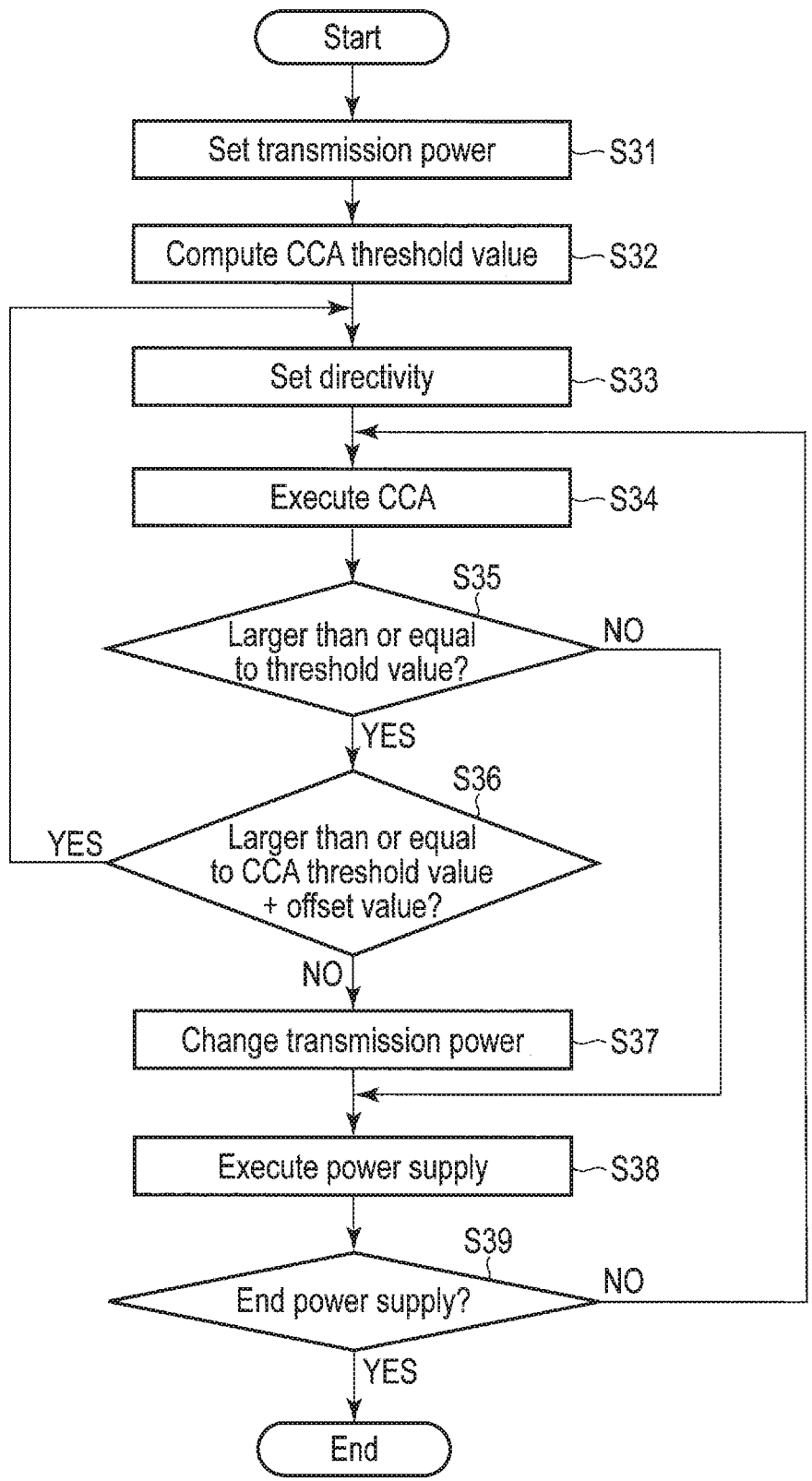
F I G. 17

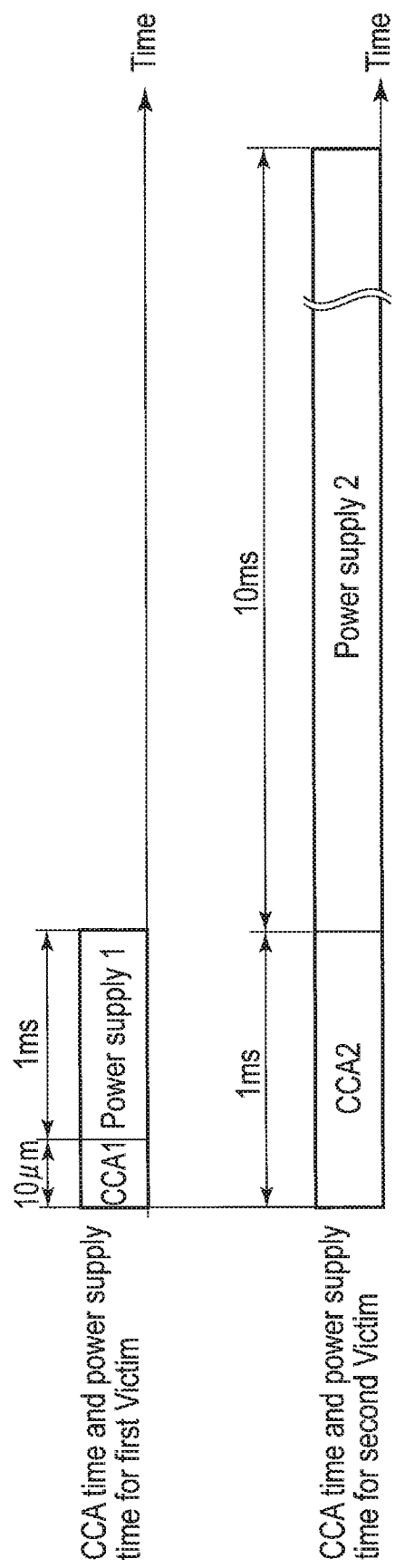
F I G. 21

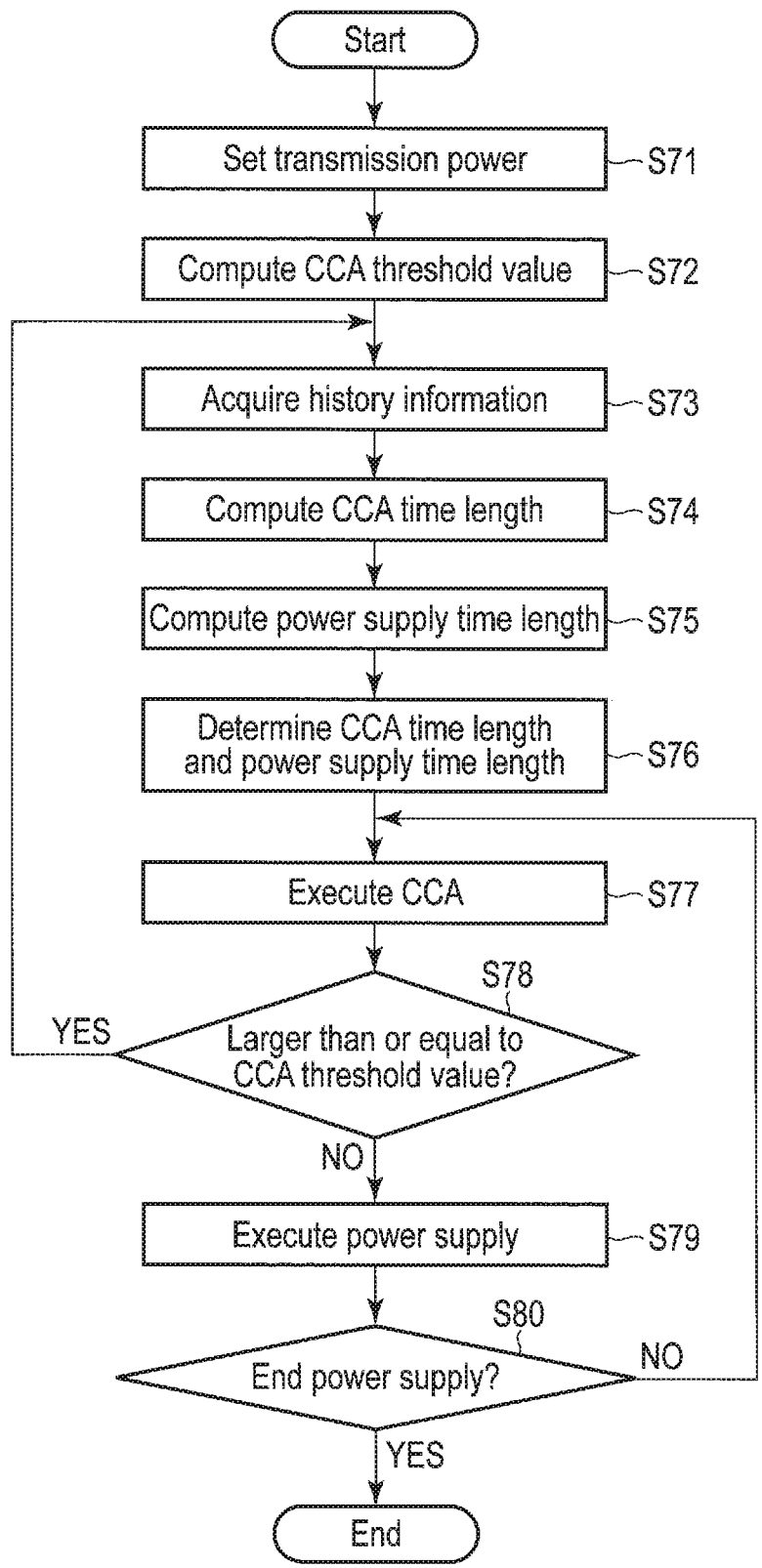
F I G. 22

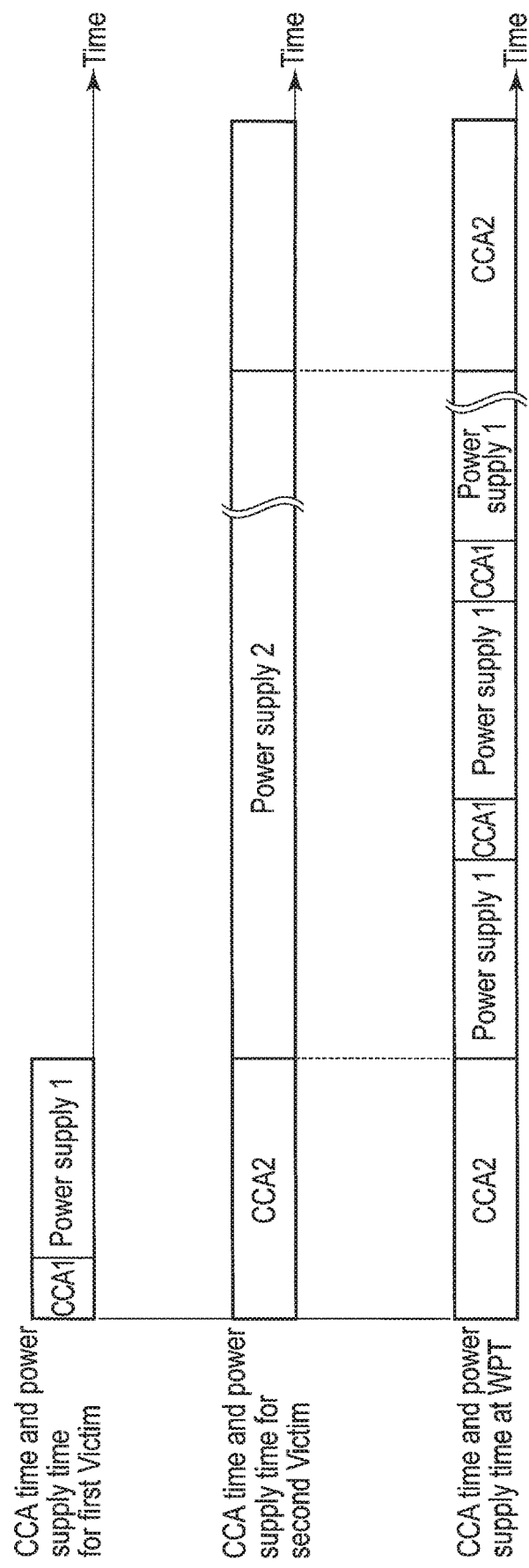
F I G. 25

ELECTRONIC APPARATUS AND METHOD

CROSS-REFERENCE TO RELATED APPLICATIONS

This application is based upon and claims the benefit of priority from Japanese Patent Application No. 2018-228316, filed Dec. 5, 2018, the entire contents of which are incorporated herein by reference.

FIELD

Embodiments described herein relate generally to an electronic apparatus and method.

BACKGROUND

Recently, a technology capable of transmitting power (supplying power) to power receiving devices by transmitting electromagnetic waves (for example, microwaves) for power supply from an electronic apparatus called a wireless power supply device has been focused.

Such a technology is released from physical restrictions on supplying power to electronic devices by wires in a conventional manner and is expected to improve convenience progressively.

Incidentally, to transmit power to power receiving devices with efficiency, the wireless power supply device needs to transmit electromagnetic waves of high power level.

However, if electromagnetic waves of certain power level are transmitted, the electromagnetic waves may exert an influence on a frequency band (close frequency band) different from a frequency band used by the wireless power supply device. In other words, power supply performed by the wireless power supply device may cause interference to the other wireless systems.

BRIEF DESCRIPTION OF THE DRAWINGS

FIG. 7 is a graph illustrating an example of a filter property in Victim terminal.

FIG. 8 is a graph illustrating an example of a mask pattern of the first CCA threshold value.

FIG. 12 is a flowchart illustrating an example of a procedure of WPT.

FIG. 14 is a diagram illustrating an arrangement example of WPT and Victim terminals in a hidden terminal environment.

FIG. 15 is a chart illustrating signals transmitted and received between Victim terminals in a hidden terminal environment.

FIG. 16 is a flowchart illustrating an example of a procedure of WPT according to a third embodiment.

FIG. 17 is a flowchart illustrating an example of a procedure of WPT when controlling a radiant power of WPT.

FIG. 21 is a chart illustrating an example of CCA periods and power supply periods for first Victim and second Victim in a fourth embodiment.

FIG. 22 is a flowchart illustrating an example of a procedure of WPT.

FIG. 25 is a chart illustrating another example of control for CCA periods and power supply periods.

DETAILED DESCRIPTION

In general, according to one embodiment, an electronic apparatus includes transmission circuitry and a processor circuitry. The transmission circuitry is configured to transmit power with a first electromagnetic wave in a first frequency band. The processor circuitry is configured to execute a carrier sense during a first period, in at least a second frequency band different from the first frequency band. The transmission circuitry is further configured to transmit power with a second electromagnetic wave in the first frequency band in a second period following the first period, if a wireless signal is not detected by the carrier sense during the first period. The processor circuitry is configured to execute the carrier sense during a third period following the first period in the at least the second frequency band, if the wireless signal is detected by the carrier sense during the first period.

Various embodiments will be described hereinafter with reference to the accompanying drawings.

First Embodiment

First, a first embodiment will be described. An electronic apparatus according to the present embodiment is a wireless power supply device including a function of transmitting (supplying) power to a power receiving device with electromagnetic waves. According to such a wireless power supply device, a power receiving device can operate with the power that is transmitted from the wireless power supply device with electromagnetic waves.

The wireless power supply device transmits the power to the power receiving device with the electromagnetic waves of a specific frequency band and, in this case, may give interference to the other wireless systems using frequency bands which are the same as or close to this frequency band. For this reason, the wireless power supply device according to the present embodiment is configured to suppress interference to the other wireless systems.

In the following descriptions, the wireless power supply device (electronic apparatus) according to the present embodiment is called a wireless power transmitter (WPT), and the other wireless system different from WPT is called Victim. Victim includes a wireless communication device (hereinafter referred to as a Victim terminal) including, for example, a base station, a terminal device, and the like performing wireless communication.

A relationship between WPT and Victim according to the present embodiment will be explained with reference to FIG. 1. WPT can transmit power to the power receiving device with electromagnetic waves as explained above, and the WPT is assumed to transmit power in, for example, frequency band F1 (first frequency band). In contrast, Victim is assumed to perform wireless communication in, for example, frequency band F2 (second frequency band).

Figure 1:
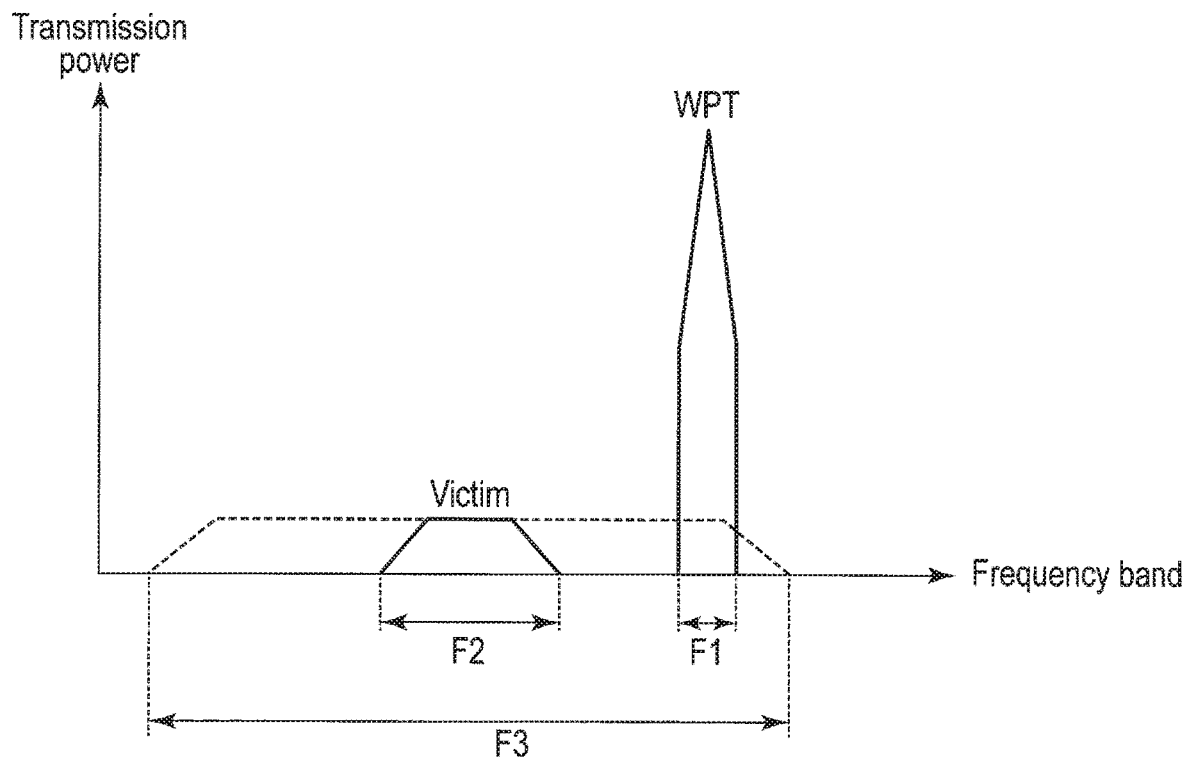
FIG. 1 is a graph illustrating a relationship between WPT and Victim according to a first embodiment.

In FIG. 1, a vertical axis shows the transmission power, and the power level (transmission power) of the electromagnetic waves transmitted from the WPT when transmitting the power is very high as compared with, for example, the power level (transmission power) of the wireless signal transmitted in the Victim.

In addition, in FIG. 1, a horizontal axis shows the frequency band and, if a difference between the frequency band F1 used by the WPT and the frequency band F2 used in the Victim is small (i.e., the frequency band F2 close to the frequency band F1 used in the WPT is used in the Victim), power supply (power transmission) in the WPT may give interference to the Victim.

Furthermore, since the Victim terminal constituting the Victim often includes an antenna capable of receiving a wireless of a frequency band F3 broader than the frequency band F2 used by the Victim, the Victim may receive more influence of the WPT.

Therefore, power supply of the WPT needs to perform by considering use conditions of not only the frequency band F1 used by the WPT, but also the close frequency band.

Thus, the WPT according to the present embodiment scans, for example, a frequency band different from the frequency band used by the WPT, and inspects whether the Victim using the frequency band exists or not by carrier sense in the frequency band. The carrier sense will be explained as clear channel assessment (CCA) for convenience, in the following descriptions.

Next, an outline of the operation in the WPT according to the present embodiment will be explained with reference to FIG. 2. A wireless signal transmitted in Victim (i.e., a wireless signal transmitted from a Victim terminal) is called a Victim signal for convenience, in the following descriptions.

In the WPT according to the present embodiment, for example, CCA is executed during T1 (first period) before power supply and, if the Victim signal is not detected in the CCA, power supply is performed during T2 (second period). When the power supply is performed in T2, the CCA is performed in T1 again.

In contrast, if the Victim signal is detected in the CCA performed during T1, the CCA is executed again during T3 (third period). If the Victim signal is not detected in the CCA performed during T3, the power supply is performed during T2.

Figure 2:
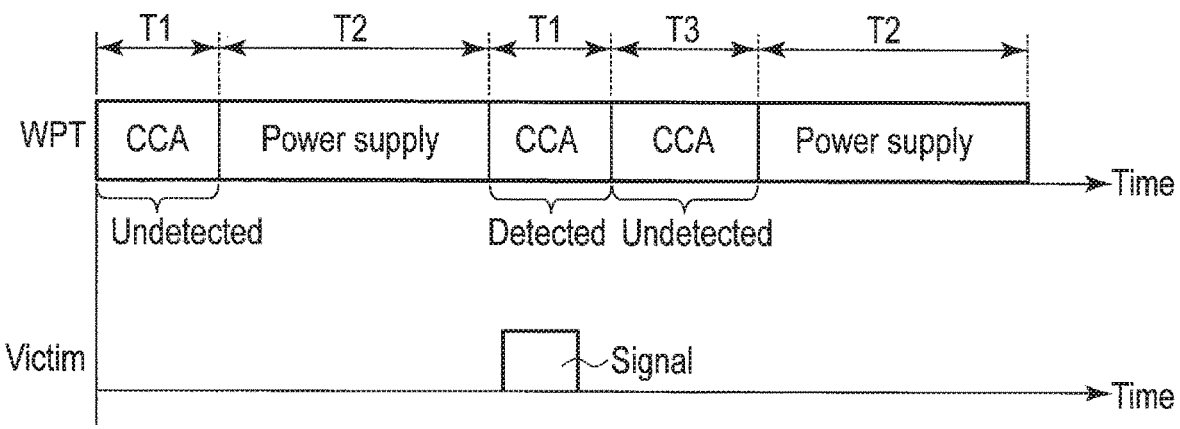
FIG. 2 is a diagram illustrating an outline of operations of WPT.

In FIG. 2, the periods T1 and T3 are different from each other, but may be the same.

In the present embodiment, since the power supply becomes capable of being performed only when the Victim signal is not detected by the operation of the WPT as illustrated in FIG. 2, interference from the WPT to the Victim can be suppressed (influence exerted on the WPT to the Victim can be reduced).

The frequency band which is the target of the CCA performed in the WPT is a frequency band used by the Victim close to the frequency band used by the WPT. If the Victim uses a plurality of channels, the channel close to the frequency band (transmission frequency) used by the WPT is the target of the CCA. In addition, plural types of Victims may exist or, the channel close to the frequency band used by the WPT, of the channels used by the Victims, may be the target of the CCA.

In addition, in the present embodiment, "close" is assumed to be defined (set) in accordance with the radiant power and installation environment of the WPT, assumed types of Victim, and the like. More specifically, if the range which can receive an influence by the power supply (power transmission) from the WPT based on the radiant power of the WPT, installation environment, and the like, can be known, the channel corresponding to the range can be set as the close channel. In addition, if the channel used by the Victim is determined, this channel may be set as the close channel. In the present embodiment, the radiant power corresponds to, for example, a sum of an antenna gain and the power level of the electromagnetic waves transmitted from the WPT.

For example, the "close channel" may be a channel closest to the frequency band used by the WPT, of the channels used by the Victim, or may be up to N-th (N: natural number) channel close to the frequency band. In addition, all the channels defined as channels close to the frequency band used by the WPT may be close channels irrespective of the type of Victim.

Figure 3:
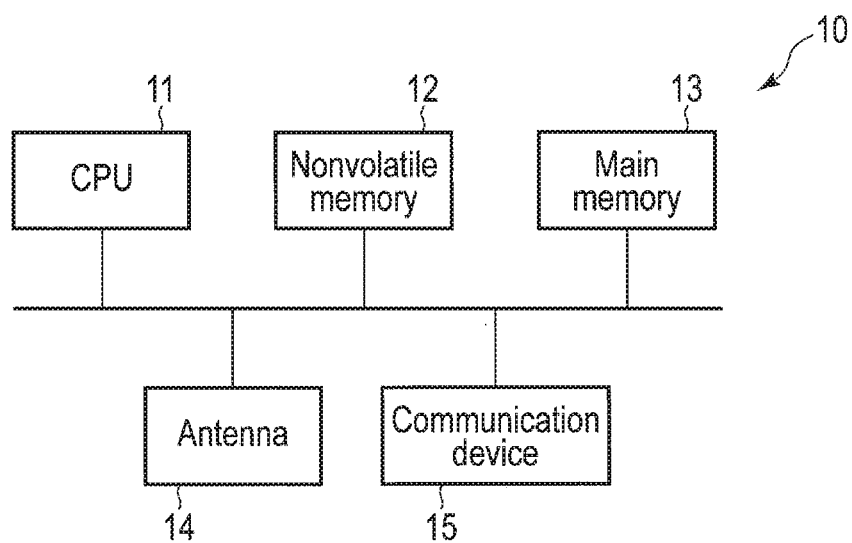
FIG. 3 is a diagram illustrating an example of a hardware configuration of WPT.

The WPT according to the present embodiment will be explained below in detail. FIG. 3 illustrates an example of a hardware configuration of WPT. As illustrated in FIG. 3, WPT 10 includes a CPU 11, a nonvolatile memory 12, a main memory 13, an antenna 14, a communication device 15, and the like.

CPU 11 is a hardware processor (processor circuitry) which controls operations of various components in the WPT 10. The CPU 11 performs various programs loaded from the nonvolatile memory 12 serving as a storage device into the main memory 13.

The antenna (transmission circuitry) 14 is configured to transmit the electromagnetic waves to transmit the power (hereinafter referred to as a power supply signal of WPT 10) in a predetermined frequency band. In addition, the antenna 14 is configured to receive a Victim signal in a frequency band, which is a target of the CCA. One or more antennas 14 may be provided or an array antenna composed of a plurality of array elements may be provided. In addition, an antenna to perform wireless communication with an external device may be provided in addition to the antenna receiving the Victim signal.

The communication device 15 is a device configured to perform communication with, for example, an external device.

Figure 4:
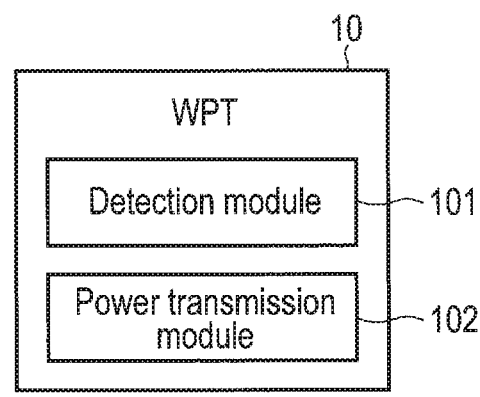
FIG. 4 is a block diagram illustrating an example of a functional configuration of WPT.

FIG. 4 is a block diagram illustrating an example of a functional configuration of the WPT 10. As illustrated in FIG. 4, the WPT 10 includes a detection module 101 and a power transmission module 102.

In the present embodiment, several parts or all parts of the detection module 101 and the power transmission module 102 are assumed to be implemented by urging the CPU 11 to perform programs, i.e., software. Several parts or all parts of the modules 101 and 102 may be implemented by an integrated circuit (IC), dedicated hardware or the like or may be implemented as a combined configuration of software and hardware.

The detection module 101 is a functional module performing the CCA (carrier sense), and detects presence or absence of a wireless signal (i.e., the Victim signal) in a frequency band different from the frequency band used by at least the WPT 10 for a predetermined period (hereinafter referred to as a CCA period). The detection module 101 determines whether the power level of the Victim signal detected in the CCA (hereinafter referred to as a Victim signal power) is larger than or equal to the threshold value. If it is determined that the Victim signal power is larger than or equal to a threshold value, the detection module 101 performs the CCA again. In addition, the detection module 101 also performs processing of computing the threshold value used in the CCA. The threshold value used in the CCA is referred to as a CCA threshold value for convenience, in the following descriptions.

The power transmission module 102 is a functional module which transmits the power by transmitting the power supply signal of the WPT 10 in the frequency band of the WPT 10. If it is determined that the Victim signal power is not detected by the detection module 101 or the detected Victim signal is not larger than or equal to the CCA threshold value (i.e., smaller than the threshold value), the power transmission module 102 transmits the power for a predetermined period (hereinafter referred to a power supply period).

Next, an example of the procedure of the WPT 10 according to the present embodiment will be explained with reference to the flowchart of FIG. 5.

First, the detection module 101 sets the power level of the power supply signal of the WPT 10 (hereinafter referred to as the transmission power of the WPT 10) (step S1). The transmission power (value) of the WPT 10 set in step S1 may be preset or may be based on the position of the power receiving device, etc. The information such as the position of the power receiving device, etc., (i.e., the information on the power receiving device) may be received from the power receiving device via the communication device 15.

Next, the detection module 101 computes the CCA threshold value based on the transmission power of the WPT 10 set in step S1 (step S2). A concrete example of the CCA threshold value computed in step S2 will be explained later.

When the processing in step S2 is executed, the detection module 101 executes the CCA (step S3). According to the CCA, presence or absence of the Victim signal is detected during the CCA period.

It is assumed here that the Victim signal is detected by executing the CCA. In this case, the detection module 101 determines whether the power level of the detected Victim signal (Victim signal power) is larger than or equal to the CCA threshold value computed in step S2 or not (step S4).

If it is determined that the Victim signal power is larger than or equal to the CCA threshold value (YES in step S4), the flow returns to step S3 and the CCA is executed again.

In contrast, if the Victim signal power is not detected or it is determined that the Victim signal power is not larger than or equal to the CCA threshold value (i.e., smaller than the CCA threshold value) (NO in step S4), the power transmission module 102 executes power supply (step S5). In this case, the power transmission module 102 transmits (supplies) the power to the power receiving device by transmitting the electromagnetic waves (i.e., the power supply signal of the WPT 10) based on the transmission power set in step S1.

Next, it is determined whether the power supply executed by the WPT 10 (power transmission module 102) is ended or not (step S6). In step S6, for example, if a time to end the power supply to the power receiving device reaches, it is determined that power supply should be ended. For example, it may be determined that the power supply should be ended when the power transmission amount (power supply amount) of the power transmission module 102 reaches a predetermined amount or it may be determined that the power supply should be ended, based on a response from the power receiving device. Furthermore, since the electromagnetic waves of high power level are transmitted at the power supply, it may be determined that the power supply should be ended when existence of a person is detected by, for example, a human sensor provided close to the WPT 10 or the power receiving device.

If it is determined that the power supply may not be ended (NO in step S6), the flow returns to step S3 and the processing is repeated. That is, if it is determined that the power supply may not be ended, the CCA and the power supply are repeated in accordance with the processing following step S3 shown in FIG. 5.

Figure 5:
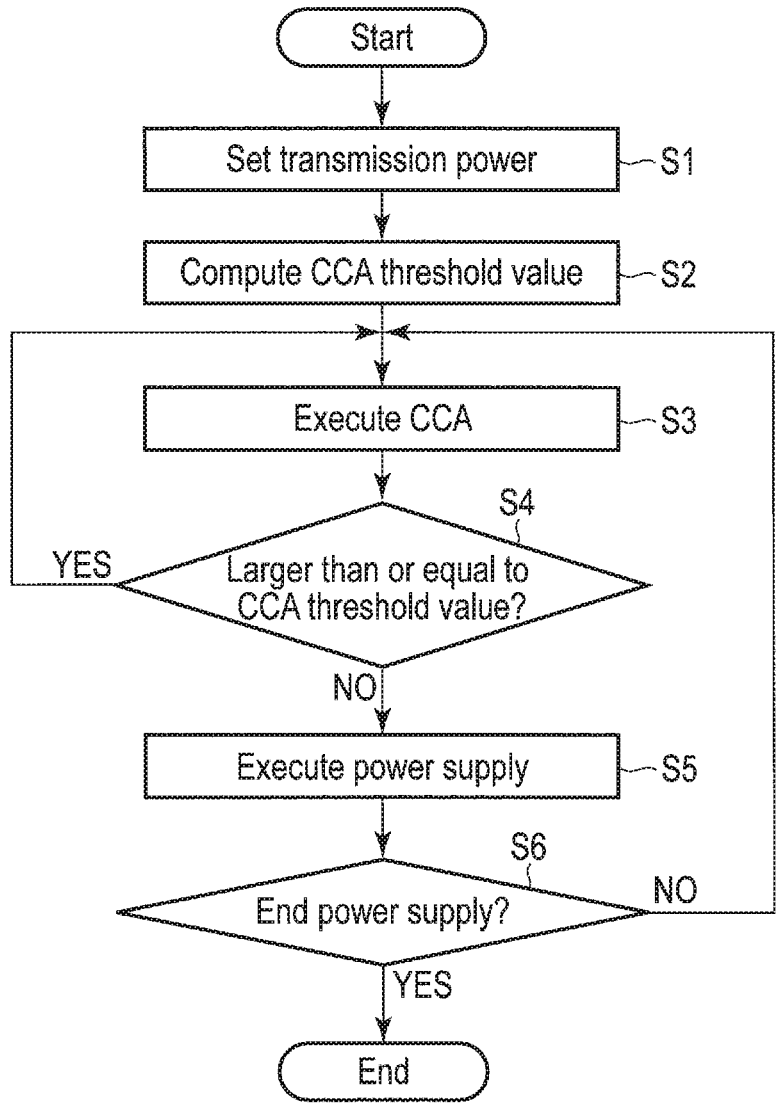
FIG. 5 is a flowchart illustrating an example of a procedure of WPT.

In contrast, if it is determined that the power supply should be ended (YES in step S6), the processing shown in FIG. 5 is ended.

For example, the processing shown in FIG. 5 may be executed regularly or may be executed if a predetermined time reaches.

As described above, the WPT 10 according to the present embodiment executes the power supply when the Victim signal is determined to be smaller than the CCA threshold value and, in the following explanations, determining that the Victim signal power is larger than the CCA threshold value (i.e., detecting the Victim signal in which the Victim signal power is larger than the CCA threshold value) is simply referred to as detecting the Victim signal. In addition, in the following explanations, a phrase "the Victim signal is not detected" indicates that the Victim signal itself is not detected and that the Victim signal power is not larger than or equal to the CCA threshold value.

A concrete example of the CCA threshold value computed in step S2 with reference to FIG. 5 will be explained. The CCA threshold value in the present embodiment is assumed to be computed under coexistence conditions of the WPT 10 and the Victim.

The CCA is executed before the power supply, in the WPT 10, as explained above, and the CCA is executed to avoid interference with the other wireless system or the like, on the Victim terminal side constituting the Victim, too.

For this reason, in the present embodiment, the CCA threshold value is assumed to be computed (set) based on, for example, the condition (hereinafter referred to as first coexistence condition) that "the power supply signal of the WPT 10 does not exert an influence on the CCA executed in the Victim (Victim terminal)" as the coexistence condition of the WPT 10 and the Victim. The CCA threshold value computed based on the first coexistence condition is referred to as a first CCA threshold value in the following descriptions. The first CCA threshold value corresponds to a threshold value set for the electromagnetic waves output by the power transmission module 102 to exert no influence on the CCA (carrier sense of the wireless communication device) of the Victim terminal.

An outline of a first CCA threshold value will be explained with reference to FIG. 6. A left part of FIG. 6 indicates a case where a power supply signal based on the transmission power P1 is transmitted (radiated) from the WPT 10 via the antenna 14 in which the antenna gain is G1 and that the power supply signal is received by the Victim terminal constituting the Victim via spatial propagation loss L.

The Victim terminal side is equipped with an antenna, and an antenna gain of the antenna is referred to as G2. In addition, an attenuation of the filter (i.e., a filter to select the wireless signal of the frequency band used by the Victim) provided at the Victim terminal is referred to as L2.

In this case, the signal power (receiving power at the Victim terminal) Prx1 of the WPT 10 arriving at the Victim terminal can be represented by the following equation (1).

$$Prx1 = P1 + G1 - L + G2 - L2 \quad \text{Equation (1)}$$

When a threshold value used at the CCA executed on the Victim terminal side is referred to as Th1, the power supply signal of the WPT 10 is detected by the CCA (CCA Busy) if Prx1 in equation (1) is larger than Th1. In this case, at the Victim, transmission of the wireless signal is suppressed to avoid interference to the power supply signal of the WPT 10, and the communication may be unable to be executed.

For this reason, to satisfy the above-described first coexistence condition, Prx1 of the above-explained equation (1) needs to be smaller than Th1 as represented by the following equation (2).

$$Prx1 = P1 + G1 - L + G2 - L2 < Th1 \quad \text{Equation (2)}$$

Figure 6:
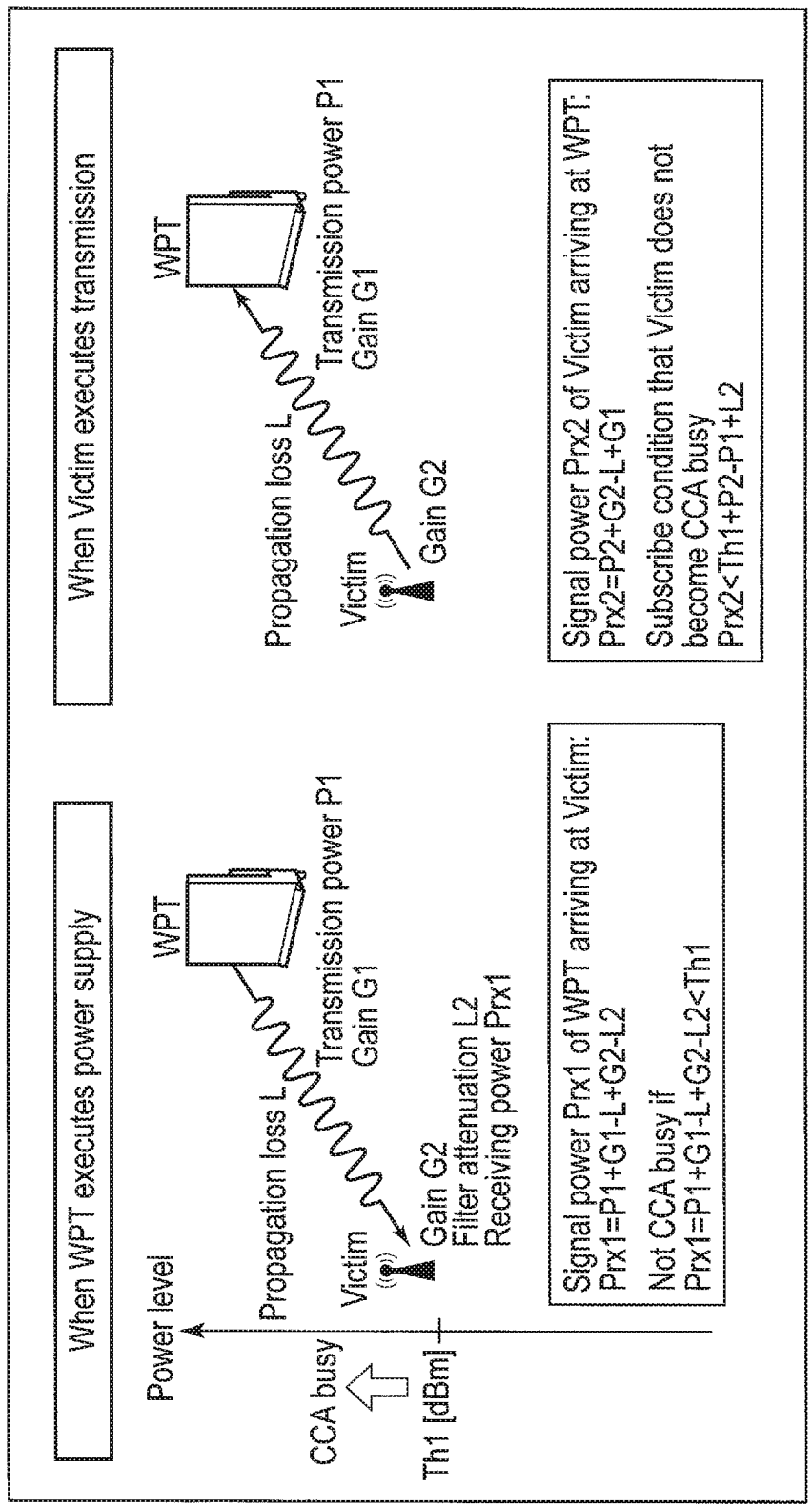
FIG. 6 is a diagram illustrating an outline of a first CCA threshold value.

Next, a right side of FIG. 6 indicates detecting the Victim signal at the CCA executed at the WPT 10. In this case, the power level (Victim signal power) Prx2 of the Victim signal arriving at the WPT 10 is represented by the following equation (3).

$$Prx2 = P2 + G2 - L + G1 \quad \text{Equation (3)}$$

P2 in the equation (3) is the transmission power at the Victim terminal (i.e., the power level of the wireless signal transmitted from the Victim terminal). In the equation (3), gains of transmitting and receiving antennas are assumed to be the same at each of the WPT 10 and the Victim terminal.

In this case, the following equation (4) is derived by substituting the equation (2) into the equation (3).

$$Prx2 < Th1 + P2 - P1 + L2 \quad \text{Equation (4)}$$

The equation (4) is indicative of the range of the power level of the Victim signal that can be detected by the WPT 10 (detection module 101) under the restriction of the above-described first coexistence condition. In other words, if the Victim signal power Prx2 satisfies the equation (4), the first coexistence condition would be satisfied.

Therefore, at the WPT 10, the power level defined at the right side of the equation (4) is computed as the first CCA threshold value and, if the Victim signal power is larger than or equal to the first CCA threshold value, the power supply is not executed by assuming that the first coexistence condition is not satisfied. In contrast, if the Victim signal power is not larger than or equal to the first CCA threshold value, the power supply is executed by assuming that the first coexistence condition is satisfied. Coexistence of the WPT 10 and the Victim can be implemented under the first coexistence condition by using such a first CCA threshold value.

The first CCA threshold value defined on the right side of the equation (4) is determined by four parameters P1, P2, Th1, and L2. P1 is the transmission power of the WPT 10 and is already known to the WPT 10 side. In addition, P2 is the transmission power at the Victim terminal, and Th1 is the threshold value used in the CCA executed at the Victim. P2 and Th1 are often represented as specification values, standard values or the like under the standards (wireless system standard, test standard or the like) employed in the Victim. L2 is a filter attenuation at the Victim terminal and also a numerical value depending on installation of the Victim terminal, and an attenuation property of a channel select filter in a general wireless system can be used (applied) as the filter attenuation.

FIG. 7 illustrates an example of an amplitude property of a channel select filter in the Victim terminal.

A filter property based on a frequency band used by Victim (Victim terminal) is illustrated in FIG. 7. In FIG. 7, the horizontal axis shows a frequency difference from the frequency band used by the Victim, and an absolute value of the vertical axis shows the filter attenuation.

In a case where the filter attenuation illustrated in FIG. 7 is used as L2 mentioned above, for example, if Th1=−62 dBm, P2=10 dBm, and P1=40 dBm, a mask pattern of the first CCA threshold value (i.e., the pattern of the first CCA threshold value according to a frequency difference between the frequency band used by the WPT 10 and the frequency band used by the Victim) becomes a pattern illustrated in FIG. 8. In FIG. 8, the horizontal axis shows the frequency difference between the frequency band used by the WPT 10 and the frequency band used by the Victim (hereinafter simply referred to as frequency difference between the WPT 10 and the Victim), and the vertical axis shows the first CCA threshold value.

When the first CCA threshold value defined on the right side of the equation (4) is computed with Th1, P2, P1, and L2 based on the attenuation property illustrated in FIG. 7, a mask pattern as represented by solid line 201 in FIG. 8 can be obtained. Since the frequency channel of the general wireless system has a discrete arrangement, the mask pattern of the first CCA threshold value may be a discrete value as represented by broken line 202 illustrated in FIG. 8.

As illustrated in FIG. 8, the first CCA threshold value is varied in accordance with the frequency difference between the WPT 10 and the Victim as explained above. That is, according to the mask pattern of the first CCA threshold value satisfying the first coexistence condition, as the frequency difference between the WPT 10 and the Victim is smaller, the influence of the WPT 10 exerted on the Victim becomes larger, and the first CCA threshold value therefore becomes a smaller (stricter) value. In contrast, as the frequency difference between the WPT 10 and the Victim is larger, the influence of the WPT 10 exerted on the Victim becomes smaller, and the first CCA threshold value therefore becomes a larger (looser) value.

When the first CCA threshold value is computed in step S2 illustrated in FIG. 5, the first CCA threshold value corresponding to the frequency difference between the WPT 10 and the Victim is specified based on the mask pattern of the first CCA threshold value, and the processing of step S4 is executed by using the specified first CCA threshold value. The frequency band used by the WPT 10 necessary to obtain the frequency difference between the WPT 10 and the Victim is assumed to be preset in the WPT 10. In addition, the frequency band used by the Victim necessary to obtain the frequency difference between the WPT 10 and the Victim is also assumed to be preset in the WPT 10. Alternatively, the frequency band may be specified based on a preset frequency band of the wireless signal which can be received in the WPT 10 or may be specified by analyzing (frequency analysis) the Victim signal detected (received) in the WPT 10.

When actually operating the WPT 10, a value obtained by further adding margin to the first CCA threshold value may be used as the first CCA threshold value. A following CCA threshold value other than the first CCA threshold value may also be used in the same manner as explained above.

Computing the CCA threshold value under the first coexistence condition has been explained, but the CCA threshold value may be computed under the other coexistence conditions.

More specifically, the coexistence condition of the WPT 10 and the Victim may be, for example, a condition that "the power supply signal of the WPT 10 does not exert an influence on the communication property of the Victim" (hereinafter referred to as a second coexistence condition). The CCA threshold value computed based on the second coexistence condition is referred to as a second CCA threshold value in the following descriptions. The second CCA threshold value corresponds to a threshold value set for the electromagnetic waves output by the power transmission module 102 to exert no influence on the communication properties of the Victim terminal (wireless communication device).

The power supply signal of the WPT 10 is a disturbing wave which becomes an interference source, as viewed from the Victim side, and the communication property (for example, communication sensitivity, throughput or the like) of the Victim may be degraded by the influence of the disturbing wave.

In general, disturbing wave regulations are specified to avoid influence of the disturbing wave to the communication properties, in the wireless system. The disturbing wave regulations define the level of the disturbing wave on which the Victim can maintain communication. According to the disturbing wave regulations, if the power level (signal level) of the power supply signal of the WPT 10 received by the Victim terminal is smaller than a specified value of the disturbing wave level of the disturbing wave regulations, the Victim can maintain communication.

An outline of a second CCA threshold value will be explained with reference to FIG. 9. A left part of FIG. 9 indicates a case where a power supply signal based on the transmission power P1 is transmitted (radiated) from the WPT 10 via the antenna 14 in which the antenna gain is G1 and that the power supply signal is received by the Victim terminal constituting the Victim via spatial propagation loss L.

If the antenna gain of the antenna provided at the Victim terminal is referred to as G2, an antenna output level of the power supply signal of the WPT 10 arriving at the Victim terminal (i.e., the power at the Victim terminal antenna output, of the signal radiated from the WPT 10) Prx3 is represented by the following equation (5).

$$Prx3 = P1 + G1 - L + G2 \quad\quad\quad \text{Equation (5)}$$

If the specified value of the disturbing wave level under the disturbing wave regulations is referred to as Th2, Prx3 of the equation (5) may be smaller than Th2 as represented by the following equation (6) to satisfy the second coexistence condition.

$$Prx3 = P1 + G1 - L + G2 < Th2 \quad\quad\quad \text{Equation (6)}$$

Figure 9:
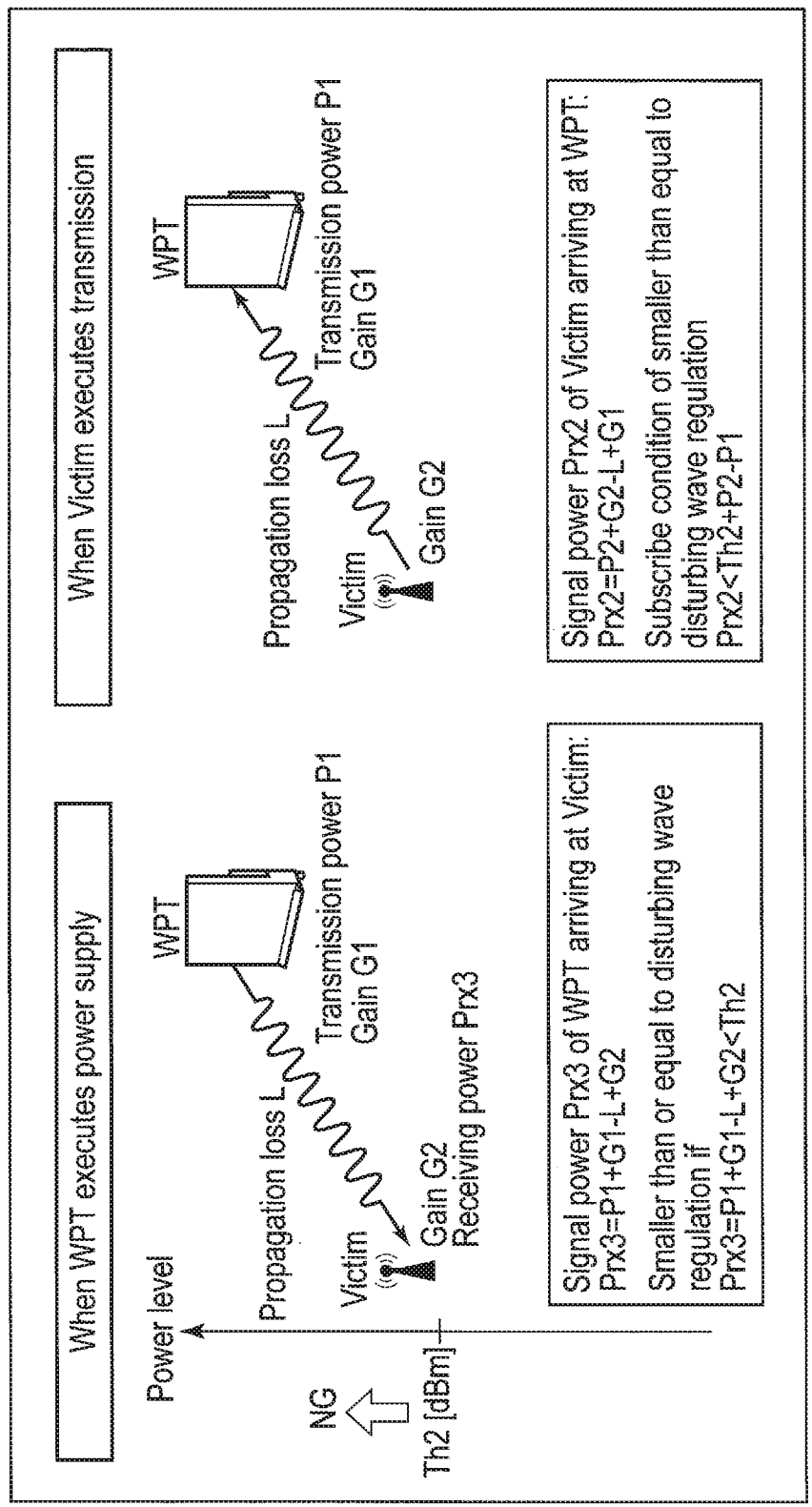
FIG. 9 is a diagram illustrating an outline of a second CCA threshold value.

Next, a right side of FIG. 9 indicates detecting the Victim signal at the CCA executed at the WPT 10. The power level (Victim signal power) Prx2 of the Victim signal arriving at the WPT 10 side is represented by the equation (3) described above. For this reason, the following equation (7) is derived by substituting the equation (6) into the equation (3).

$$Prx2 < Th2 + P2 - P1 \quad\quad\quad \text{Equation (7)}$$

The equation (7) is indicative of the range of the power level of the Victim signal that can be detected by the WPT 10 (detection module 101) under the restriction of the above-described second coexistence condition. In other words, if the Victim signal power Prx2 satisfies the equation (7), the second coexistence condition would be satisfied.

Therefore, at the WPT 10, the power level defined at the right side of the equation (7) is computed as the second CCA threshold value and, if the Victim signal power is larger than or equal to the second CCA threshold value, the power supply is not executed by assuming that the second coexistence condition is not satisfied. In contrast, if the Victim signal power is not larger than or equal to the second CCA threshold value, the power supply is executed by assuming that the second coexistence condition is satisfied. Coexistence of the WPT 10 and the Victim can be implemented under the second coexistence condition by using such a second CCA threshold value.

In general, a value varied according to the frequency difference between the frequency band used by the Victim and the frequency band of the disturbing wave is defined as the specified value of the disturbing wave level in the wireless system. For example, a value of −63 dBm may be defined as the specified value of the disturbing wave level in a case where the frequency difference is 20 MHz or lower, and a value of −47 dBm may be defined as the specified value of the disturbing wave level in a case where the frequency difference is higher than 20 MHz and is 40 MHz or lower.

Figure 10:
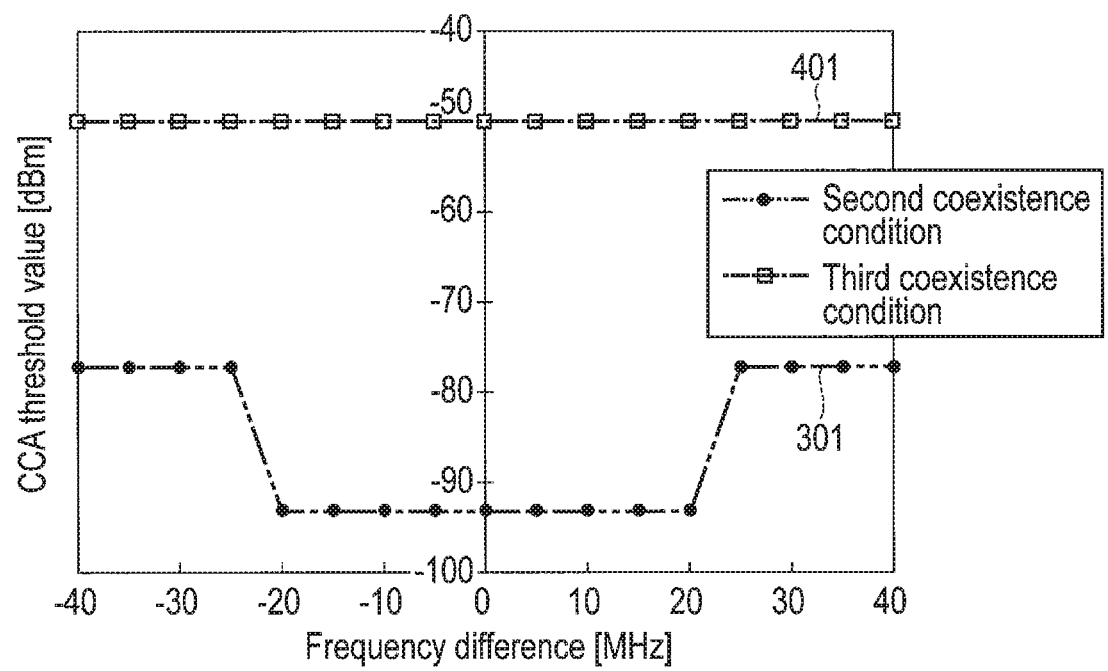
FIG. 10 is a graph illustrating an example of mask patterns of the second CCA threshold value and a third CCA threshold value.

In this case, for example, if P2=10 dBm and P1=40 dBm, a mask pattern of the second CCA threshold value (i.e., the pattern of the second CCA threshold value according to a frequency difference between the WPT 10 and the Victim) becomes a first line 301 illustrated in FIG. 10. In FIG. 10, the horizontal axis shows the frequency difference between the WPT 10 and the Victim, and the vertical axis shows the second CCA threshold value.

When the second CCA threshold value is computed in step S2 illustrated in FIG. 5, the second CCA threshold value corresponding to the frequency difference between the WPT 10 and the Victim is specified based on the mask pattern of the second CCA threshold value, and the processing of step S4 is executed by using the specified second CCA threshold value.

Furthermore, the coexistence condition of the WPT 10 and the Victim can be, for example, a condition that "the power supply signal of the WPT 10 does not exert an influence on performance of an analog circuit provided in the Victim (Victim terminal)" (hereinafter referred to as a third coexistence condition). The CCA threshold value computed based on the third coexistence condition is referred to as a third CCA threshold value in the following descriptions.

The third CCA threshold value corresponds to a threshold value set for the electromagnetic waves output by the power transmission module 102 to exert no influence on the performance of the analog circuit provided at the Victim terminal (wireless communication device).

As explained above, the power level (transmission power) of the power supply signal of the WPT 10 is often higher than the power level of the wireless signal transmitted from a general wireless communication terminal and the like. The wireless communication terminal includes the analog circuit, and the performance of the analog circuit is often degraded (or broken) by receiving signals of high power level.

For this reason, a maximum power level of the signal which can be received by the analog circuit (receiver circuit) is defined in a number of wireless systems. A value obtained by adding margin to the maximum power level thus defined is referred to as a limit receiving power level Th3 to derive an equation satisfying the above third coexistence condition. In this case, an equation (8) is derived by replacing Th2 with Th3 in the above equation (7).

$$Prx2 < Th3 + P2 - P1 \qquad \text{Equation (8)}$$

Deriving the equation (8) has been explained with respect to the above second coexistence condition, and its detailed explanations will be omitted.

The equation (8) is indicative of the range of the power level of the Victim signal that can be detected by the WPT 10 (detection module 101) under the restriction of the above-described third coexistence condition. In other words, if the Victim signal power Prx2 satisfies the equation (8), the third coexistence condition would be satisfied.

Therefore, at the WPT 10, the power level defined at the right side of the equation (8) is computed as the third CCA threshold value and, if the Victim signal power is larger than or equal to the third CCA threshold value, the power supply is not executed by assuming that the third coexistence condition is not satisfied. In contrast, if the Victim signal power is not larger than or equal to the third CCA threshold value, the power supply is executed by assuming that the third coexistence condition is satisfied. Coexistence of the WPT 10 and the Victim can be implemented under the third coexistence condition by using such a third CCA threshold value.

If P2=10 dBm and P1=40 dBm in a case where, for example, the limit receiving power level (Th3) is defined as −20 dBm, a mask pattern of the third CCA threshold value (i.e., the pattern of the third CCA threshold value according to a frequency difference between the WPT 10 and the Victim) becomes a second line 401 illustrated in FIG. 10. The above limit receiving power level is constant irrespective of the frequency difference. For this reason, a mask pattern of the third CCA threshold value is a flat mask pattern taking the same value irrespective of the frequency difference, unlike the other mask patterns (i.e., the mask patterns of the first CCA threshold value and the second CCA threshold value).

When the third CCA threshold value is computed in step S2 illustrated in FIG. 5, the processing of step S4 is executed by using the third CCA threshold value (i.e., a constant value).

In the present embodiment as described above, for example, if the Victim signal is not detected by the CCA executed during the CCA period (first period), the power is transmitted (i.e., the power is supplied) during the power supply period (second period). If the Victim signal is detected by the CCA, the CCA is further executed during the CCA period (third period).

In the present embodiment, interference from the WPT 10 to the Victim can be suppressed by such a configuration, since the power supply is not executed if there is high probability of exerting an influence on the Victim (other wireless system) and since the power supply can be executed if there is low probability of exerting an influence on the Victim.

In addition, for example, the CCA in the present embodiment is executed based on the first CCA threshold value set to exert no influence on the CCA executed in the Victim. According to such a configuration, the coexistence of the WPT 10 and the Victim can be implemented under a restriction of the above first coexistence condition (i.e., the condition that "the power supply signal of the WPT 10 does not exert an influence on the CCA executed in the Victim").

The first CCA threshold value is varied in accordance with the frequency difference between the WPT 10 and the Victim. According to the first CCA threshold value, for example, the CCA (detection of the Victim signal) considering the frequency difference can be executed by setting the first CCA threshold value to a stricter value as the frequency difference is smaller and setting the CCA threshold value to a looser value as the frequency difference is larger.

Furthermore, for example, the CCA in the present embodiment may be executed based on the second CCA threshold value set to exert no influence on the communication property of the Victim. According to such a configuration, the coexistence of the WPT 10 and the Victim can be implemented under a restriction of the above second coexistence condition (i.e., the condition that "the power supply signal of the WPT 10 does not exert an influence on the communication property in the Victim").

Furthermore, for example, the CCA in the present embodiment may be executed based on the third CCA threshold value set to exert no influence on the performance of the analog circuit provided in the Victim. According to such a configuration, the coexistence of the WPT 10 and the Victim can be implemented under a restriction of the above third coexistence condition (i.e., the condition that "the power supply signal of the WPT 10 does not exert an influence on the performance of the analog circuit provided in the Victim").

In the present embodiment, the first CCA threshold value is a value varied in accordance with, for example, the frequency difference between the WPT 10 and the Victim, and the CCA threshold value may be a value varied in accordance with, for example, the distance between the WPT 10 and the Victim (Victim terminal).

In the present embodiment, the first to third CCA threshold values are used as the CCA threshold values, and the WPT 10 according to the present embodiment can be configured to use predetermined one of the first to third CCA threshold values.

In addition, the WPT 10 can also be configured to use a combination of the first to third CCA threshold values and to selectively use one of the first to third CCA threshold values. In this case, the WPT 10 may be configured to refer to each of the mask patterns of the first to third CCA threshold values, to specify the first to third CCA threshold values corresponding to the frequency difference between the WPT 10 and the Victim, and to use the strictest (smallest) value of the specified first to third CCA threshold values as the CCA threshold value.

The CCA threshold value (first to third CCA threshold values) defined on the right side of the equations (4), (7), and (8) is varied in accordance with the transmission power (P1) of the WPT 10. More specifically, the CCA threshold value becomes larger if the transmission power of the WPT 10 is lowered. For this reason, for example, if the power level (Victim signal power) of the Victim signal detected by the WPT 10 (detection module 101) exceeds (surpasses) the CCA threshold value by 1 dB, the power supply can be executed under the restriction of the CCA threshold value (coexistence condition) by adjusting (resetting) the transmission power of the WPT 10 to lower.

That is, in the present embodiment, for example, if the Victim signal is detected at the CCA, the transmission power of the WPT 10 may be adjusted such that the Victim signal power becomes smaller than the CCA threshold value (i.e., the power supply can be executed).

Furthermore, if the CCA is repeated in the above processing illustrated in FIG. 5, the CCA threshold value may be varied every time the CCA is executed. More specifically, the CCA using the CCA threshold value varied step by step, for example, using a CCA threshold value of reduced margin at the first CCA and using a CCA threshold value of increased margin at the second CCA, may be executed. A CCA threshold value of increased margin may be used at the first CCA and a CCA threshold value of reduced margin may be used at the second CCA. In addition, the CCA threshold value (first to third CCA threshold values) to be used may be varied every time the CCA is executed.

In the present embodiment, the first to third CCA threshold values under the first to third coexistence conditions have been mainly explained, but a CCA threshold value under the other coexistence condition may be used as the CCA threshold value.

Second Embodiment

Next, a second embodiment will be described. In the present embodiment, the same portions as those in the drawings used in the explanations of the first embodiment are denoted by the same reference numerals and then explained. In the following explanations, different portions from the first embodiment will be mainly explained.

Figure 11:
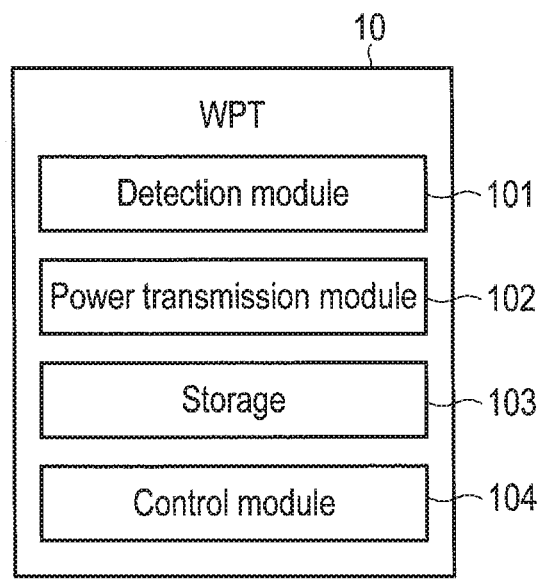
FIG. 11 is a block diagram illustrating an example of a functional configuration of WPT according to a second embodiment.

FIG. 11 is a block diagram illustrating an example of a functional configuration of WPT 10 according to the present embodiment. As illustrated in FIG. 11, the WPT 10 includes storage 103 and a control module 104 in addition to the detection module 101 and the power transmission module 102 explained in the above-described first embodiment.

In the present embodiment, the storage 103 is implemented by, for example, the nonvolatile memory 12 illustrated in FIG. 3. In addition, several parts or all parts of the control module 104 are assumed to be implemented by, for example, urging the CPU 11 illustrated in FIG. 3 to execute programs, i.e., software. Several parts or all parts of the control module 104 may be implemented by an IC, dedicated hardware, or the like or may be implemented as a combined configuration of software and hardware.

As explained in the above first embodiment, the detection module 101 can detect the presence or absence of the Victim signal during the CCA period (i.e., execute the CCA), and the storage 103 stores a result of the CCA (i.e., a result on whether the Victim signal is detected or not) as history information.

The control module 104 includes a function of controlling (changing) a CCA period at the CCA to be executed later and a power supply period at the power supply, in accordance with the history information stored in the storage 103.

That is, the present embodiment is different from the above-described first embodiment with respect to a feature of controlling the future CCA period and the power supply period based on the result of the CCA executed previously.

Next, an example of the procedure of the WPT 10 according to the present embodiment will be explained with reference to the flowchart of FIG. 12. The storage 103 in the WPT 10 is assumed to already store the result (history information) of the previous CCA.

Portions different from those in the processing illustrated in FIG. 5 will be mainly explained and detailed explanations of the same portions as those in FIG. 5 will be omitted.

First, the processing in steps S11 and S12 corresponding to the above-explained processing in steps S1 and S2 illustrated in FIG. 5 is executed.

Next, the control module 104 acquires the history information stored in the storage 103 (step S13). For example, the history information acquired in step S13 is indicative of whether the Victim signal is detected or not. The history information acquired in step S13 may be, for example, a result of one-time CCA executed recently or results of plural-time CCA executed previously.

The control module 104 computes the CCA period based on the history information acquired in step S13 (step S14).

In step S14, the control module 104 computes the number of times at which the Victim signal is detected (hereinafter referred to as the number of times of detection of the Victim signal), based on the history information acquired in step S13.

If the number of times of detection of the Victim signal computed by the control module 104 is larger than or equal to a predetermined value, the control module 104 estimates that the influence exerted on the Victim is large, and computes a CCA period longer than a predetermined CCA period (hereinafter referred to as an initial value of the CCA period).

If the number of times of detection of the Victim signal computed by the control module 104 is not larger than or equal to a predetermined value, the control module 104 estimates that the influence exerted on the Victim is small, and computes a CCA period shorter than the initial value of the CCA period.

When the control module 104 executes the processing of step S14, the power supply period is computed based on the history information acquired in step S13 (step S15).

As described above, if the number of times of detection computed by the control module 104 is larger than or equal to a predetermined value, the control module 104 estimates that the influence exerted on the Victim is large, and computes a power supply period shorter than a predetermined power supply period (hereinafter referred to as an initial value of the power supply period).

If the number of times of detection of the Victim signal computed by the control module 104 is not larger than or equal to a predetermined value, the control module 104 estimates that the influence exerted on the Victim is small, and computes a power supply period longer than the initial value of the power supply period.

The CCA period and the power supply period are computed by using the number of times of detection of the Victim signal in steps S14 and S15, but a detection frequency of the Victim signal (i.e., a frequency at which the Victim signal is detected), a detection period of the Victim signal (i.e., a period in which the Victim signal is detected) or the like may be used instead of the number of times of detection. That is, the CCA period and the power supply period may be controlled based on statistics computed based on the history information store in the storage 103, and the like.

When the processing in step S15 is executed, the processing in steps S16 to S19 corresponding to the above-explained processing in steps S3 to S6 illustrated in FIG. 5 is executed. In this case, in step S16, the CCA is executed during the CCA period computed in the processing of step S14. In addition, in step S18, the power supply is executed during the power supply period computed in step S15.

In addition, if the processing in step S17 is executed, the result of the processing (i.e., the result of the CCA) in step S17 is stored in the storage 103 as the history information. The history information thus stored in the storage 103 can be used in the following processing illustrated in FIG. 12.

In addition, if it is determined that the Victim signal power is larger than or equal to the CCA threshold value in step S17, the flow returns to step S13 and the processing is repeated. In this case, for example, the processing in step S16 may be executed again while maintaining the CCA period computed in step S14.

In addition, if it is determined that the power supply may not be ended in step S19, the flow returns to step S16 and the processing is repeated. In this case, the flow may return to step S13 and the processing may be repeated.

According to the above-explained processing illustrated in FIG. 12, the CCA period and the power supply period can be controlled based on the result of the previous CCA.

Both of the CCA period and the power supply period are controlled in the processing illustrated in FIG. 12, but one of the CCA period and the power supply period may be controlled (changed).

In the present embodiment, as described above, the result of executing the CCA (i.e., the result of carrier sense) is stored in the storage 103 as the history information, and at least one of lengths of the CCA period and the power supply period (first period, second period, and third period) is changed based on the history information stored in the storage 103.

According to this configuration, the detection accuracy of the Victim signal can be improved by extending the CCA period, in an environment in which, for example, the number of times of detection (detection rate) of the Victim signal is increased. In addition, the quantity of interference of the WPT 10 to the Victim or the probability that the WPT 10 exerts an influence on the Victim can be reduced by shortening the power supply period.

In contrast, the power supply efficiency can be improved by shortening the CCA period or extending the power supply period, in an environment in which, for example, the number of times of detection of the Victim signal is reduced.

The processing in steps S14 and S15 is often repeated as explained with reference to FIG. 12 but, if the CCA period or the power supply period is controlled to be extremely long or short by repeating the processing, the WPT 10 and the Victim may not operate (function) appropriately. For this reason, in the present embodiment, limit values (i.e., an upper limit value and a lower limit value) are assumed to be set for the CCA period and the power supply period.

In addition, one of the CCA period and the power supply period may be controlled with priority in such a configuration. More specifically, the CCA period may be controlled with priority while fixing the power supply period and, if the CCA period reaches the limit value, the power supply period may be controlled. In contrast, the power supply period may be controlled with priority while fixing the CCA period and, if the power supply period reaches the limit value, the CCA period may be controlled.

The concrete numerical values of the CCA period and the power supply period controlled in the present embodiment may be determined in accordance with the wireless communication format adopted by an assumed Victim. In addition, the CCA period and the power supply period may be controlled such that the time in which the Victim occupies the wireless channel (frequency band) and the time in which the WPT 10 occupies the wireless channel (frequency band) are equitable. Furthermore, the CCA period and the power supply period may be controlled such that the probability for the Victim to acquire an access right to the wireless channel and the probability for the WPT 10 to acquire an access right to the wireless channel are approximately the same.

For example, when it is assumed that the Victim is a wireless LAN system conforming to IEEE802.11 standard (hereinafter referred to as wireless LAN system), a packet signal of the wireless LAN conforms to Carrier Sense Multiple Access (CSMA) protocol. In this case, the CCA period and the power supply period in the WPT 10 may be controlled in consideration of the CSMA protocol.

Figure 13:
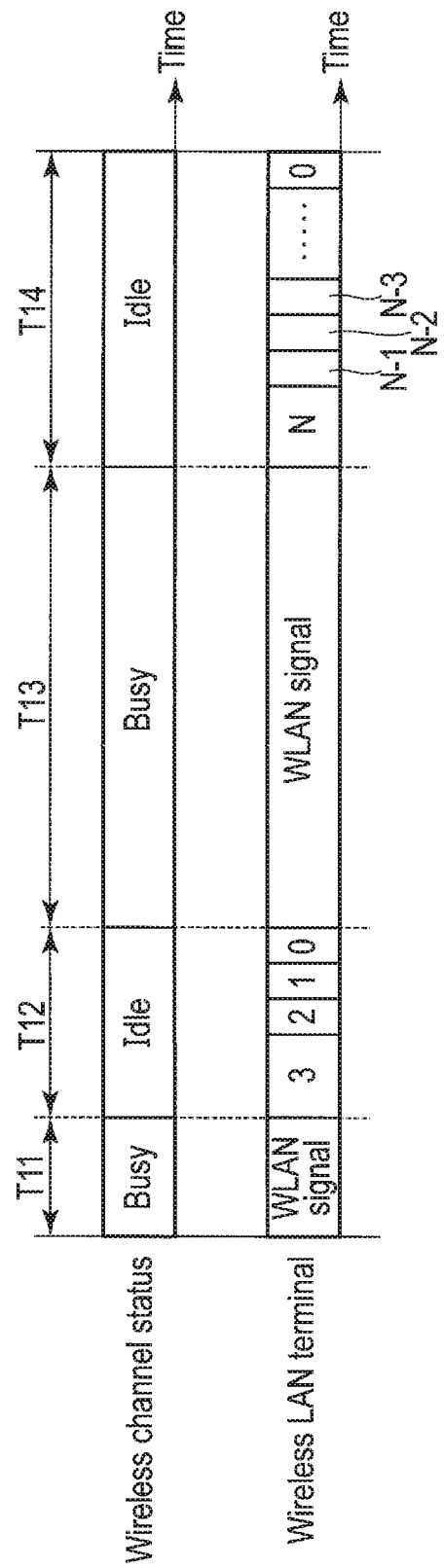
FIG. 13 is a chart illustrating an example of operations on channel access of a wireless LAN terminal constituting a wireless LAN system according to CSMA protocol.

FIG. 13 illustrates an example of operations on channel access of the wireless LAN terminal constituting the wireless LAN system according to CSMA protocol.

The wireless LAN terminal creates a random value (random backoff: BOF) within a predetermined range prior to transmitting the wireless signal and repeats the CCA in a fixed sensing slot time and, if capable of confirming that the channel is free for BOF, transmits the wireless signal.

In the example illustrated in FIG. 13, the wireless LAN terminal confirms that the channel is free in a period in which a BOF counter changes from 3 to 0, which includes an initial delay time, by executing the CCA during T12 after the wireless signal is transmitted in T11, and transmits the wireless signal in following T13.

The range of creation of the BOF is set to Contention Window (CW) size, and the BOF taking a variable value in accordance with a status of an immediately previous communication error (failure) is created. That is, in the example illustrated in FIG. 13, the CCA is executed again in T14 after T13, and BOF counter value N in this case is variable in accordance with the status of the communication error in T13. For example, if the number of times of communication error in T13 is large, the upper limit value of the BOF counter value becomes large.

When it is assumed that the Victim is the above-explained wireless LAN system, the CCA period at the WPT 10 can be set to conform to the CSMA protocol. In this case, the WPT 10 is assumed to be configured to recognize the communication status of the wireless LAN since the BOF counter needs to be controlled in accordance with the communication status of the wireless LAN, similarly to the above-explained wireless LAN terminal.

In contrast, even if the Victim is the wireless LAN system, the CCA period at the WPT 10 may not be made to strictly conform to the CSMA protocol (i.e., may be modified). In this case, for example, the CCA period at the WPT 10 may be defined by a fixed sensing slot time, similarly to the wireless LAN, and the BOF counter value may be determined in accordance with coexistence environment of the WPT 10 and the Victim. For example, the BOF counter value can be set to a larger value if the number of times of detection of the Victim signal in the previous CCA (history information) is large, and the BOF counter value can be set to a smaller value if the number of times of detection is small. According to this, the channel access similar to the wireless LAN can also be implemented at the WPT 10.

In addition, the time for which the wireless LAN terminal can occupy the channel (hereinafter referred to as a channel occupancy time of the wireless LAN terminal) is defined by a packet length and a parameter called Transmission Opportunity (TXOP), in the wireless LAN. In this case, the power supply period at the WPT 10 can be made substantially the same as the above channel occupancy time of the wireless LAN terminal to make the channel occupancy time equitable.

More specifically, if the WPT 10 includes a function of receiving and decoding the wireless LAN signal, the power supply period of the WPT 10 can be set (controlled) to be substantially the same as the channel occupancy time of the wireless LAN terminal, by interpreting the packet length of the wireless LAN packet or the TXOP parameter.

In contrast, if the WPT 10 does not include a function of receiving and decoding the wireless LAN signal, control of setting the power supply period to be shorter as the initial setting of the WPT 10 and changing the power supply period in accordance with the number of times of detection of the Victim signal in the previous CCA may be executed. For example, if the number of times of detection of the Victim signal in the previous CCA is large, interference to the Victim can be reduced by maintaining the power supply period or controlling the power supply period to be shorter. If the number of times of detection of the Victim signal in the previous CCA is small, improvement of the power supply efficiency can be attempted by controlling the power supply period to be longer.

The initial values may be set for the CCA period and the power supply period at the WPT 10 as explained above, and the initial value of the CCA period may be set to be longer while the initial value of the power supply period may be set to be shorter. According to this, the power supply can be started in a state in which an influence to the existing Victim is minimized. After that, if the number of times of detection of the Victim signal in the CCA executed at the WPT 10 is small, the power supply efficiency can be improved by changing the CCA period to be shorter or changing the power supply period to be longer. In contrast, if the number of times of detection of the Victim signal in the CCA executed at the WPT 10 is large, the interference to the Victim can be suppressed by changing the CCA period to be longer or changing the power supply period to be shorter. If the number of times of detection of the Victim signal in the CCA executed at the WPT 10 is large, the CCA period and the power supply period may be maintained.

In addition, in a configuration of changing (controlling) the CCA period and the power supply period, the Victim may be unable to make a channel access permanently by repeating the change. For example, if the CCA period of the WPT 10 becomes shorter than (the minimum value of) the CCA period executed by the Victim, the power supply signal of the WPT 10 is detected at any time at the CCA executed by the Victim and the Victim may be unable to make a channel access. Alternatively, if the power supply period of the WPT 10 remarkably exceeds a temporary storage time of a buffer for transmitted data at the Victim, the Victim may break the data to be transmitted. For this reason, limit values (i.e., an upper limit value and a lower limit value) are assumed to be set for the CCA period and the power supply period as explained above, in an environment in which the WPT 10 and the Victim exist together.

Incidentally, since wireless communication is executed at the Victim, a plurality of Victim terminals constituting the Victim exist and, a coexistence environment that only wireless signals (Victim signals) of some of the Victim terminals can be detected by the WPT 10 as illustrated in, for example, FIG. 14 is assumed. The example illustrated in FIG. 14 is the coexistence environment (scenario) that the Victim is composed of a plurality of Victim terminals A and B, a wireless signal from the Victim terminal A cannot be detected at the WPT 10 but a wireless signal from the Victim terminal B can be detected at the WPT 10. In such a coexistence environment, the influence which the power supply signal of the WPT 10 exerts on the Victim terminal A unable to detect the wireless signal needs to be considered. Such a coexistence environment is called a hidden terminal environment, and a Victim terminal A unable to detect the wireless signal is called a hidden terminal.

The WPT 10 can detect the wireless signal from the Victim terminal B by the CCA as explained above, but cannot detect the wireless signal from the Victim terminal A due to an influence of an obstacle or the like. In such a coexistence environment, for example, when the transmission from the Victim terminal B to the Victim terminal A is dominant (i.e., when the wireless signal is transmitted from the Victim terminal B to the Victim terminal A), this matter does not cause a problem since the wireless signal from the Victim B can be detected at the WPT 10. In contrast, when the transmission from the Victim terminal A to the Victim terminal B is dominant (i.e., when the wireless signal is transmitted from the Victim terminal A to the Victim terminal B), the Victim signal cannot be detected, which is a reason for exerting an influence on the Victim. In other words, in such a case, the WPT 10 often cannot recognize the existence of the Victim or execute appropriate control.

However, for example, even when the transmission from the Victim terminal A to the Victim terminal B is dominant, response signals are periodically transmitted from the Victim terminal B to the Victim terminal A as illustrated in FIG. 15.

Therefore, it is effective of detect the response signals from the Victim terminal B at the WPT 10. That is, the WPT 10 can recognize the existence of the Victim terminal B (i.e., Victim) by detecting the response signals at the WPT 10.

The transmission timing of the above response signal is varied according to the wireless communication format adopted by the Victim, for example, in a case where the response signal is transmitted when the packet is correctly received, a case where the response signal is transmitted when the packet cannot be correctly received, a case where the response signal is transmitted after a plurality of packets are received, or the like.

If an influence is exerted on the Victim by the power supply signal of the WPT 10, the response signal may not be transmitted and the WPT 10 needs to execute the CCA for a sufficiently long CCA period that enables the response signal to be detected.

In this case, the probability that, for example, a part of the Victim terminal is a hidden terminal is assumed at the WPT 10, and the initial value of the CCA period is set to be longer than or equal to at least the packet length of the Victim. For example, if the Victim is the wireless LAN system, the initial value of the CCA period may be larger than or equal to the maximum burst length of the wireless LAN. In addition, the initial value of the CCA period may be set to be larger than or equal to the maximum data frame length+SIFS+ACK frame length or may be set to be larger than or equal to the maximum value of the TXOP parameter. As the initial value of the CCA period is larger, the influence exerted on the hidden terminal can be reduced.

After thus setting the initial value, the CCA period may be controlled in accordance with the number of times of detection (detection result) of the Victim signal. As the index of controlling the CCA period, the detection frequency and the detection period of the Victim signal, and the like can be used in addition to the above the number of times of detection of the Victim signal. That is, if the number of times of detection is large, the detection frequency is high, or the detection period is long, the CCA period is controlled to be longer. In this case, the power supply period may be controlled to be shorter simultaneously. In contrast, if the number of times of detection is small, the detection frequency is low, or the detection period is short, the CCA period is controlled to be shorter. In this case, the power supply period may be controlled to be longer simultaneously.

Since the timing at which the Victim terminal starts communication and the timing at which the hidden terminal environment occurs cannot be recognized, the WPT 10 desirably changes the CCA period and the power supply period periodically. More specifically, for example, when the number of times of detection of the Victim signal at the CCA is small, control of making the CCA period shorter and making the power supply period longer is executed, and control of periodically making the CCA period longer and making the power supply period shorter is further executed. In this case, control to periodically return the CCA period and the power supply period to initial values may be executed.

That is, in the present embodiment, when the lengths of the CCA period (first period and third period) and the power supply period (second period) are changed, the lengths of the CCA periods and the power supply period may be changed (controlled) again to be close to initial values at predetermined timing (i.e., when a determined period has passed). Such control may be executed for at least one of the CCA period (first period and third period) and the power supply period (second period).

According to such a configuration, for example, the WPT 10 can be operated appropriately (i.e., the interference to the Victim can be avoided) by considering the probability that, for example, the hidden terminal environment will occur.

Third Embodiment

A third embodiment will be described. In the present embodiment, the same portions as those in the drawings used in the explanations of the first and second embodiments are denoted by the same reference numerals and then explained. In the following explanations, different portions from the first and second embodiments will be mainly explained. A functional configuration of a WPT 10 of the present embodiment is assumed to be the same as that of the above-described second embodiment.

The present embodiment is different from the above first and second embodiments with respect to a feature that WPT 10 includes a directivity forming function to control a direction for transmitting the power (i.e., transmitting the power supply signal of the WPT 10). The directivity forming function may be implemented by using a phased array antenna composed of a plurality of array elements or using a plurality of antennas having different directivities, as the antenna 14 illustrated in FIG. 3.

The directivity forming function (antenna directivity) of the antenna 14 is applied to not only transmission of the power supply signal, but also reception of the Victim signal. That is, in the present embodiment, the directivity for transmitting the power (i.e., executing the power supply) is assumed to be the same as the directivity for executing the CCA.

When the antenna directivities of transmission and reception are thus made the same, facility to transmit the electromagnetic waves in each direction becomes the same as facility to receive the electromagnetic waves in each direction. In other words, in the present embodiment, the power supply signal can easily be transmitted to the Victim terminal from which the Victim signal is detected in the CCA while the power supply signal cannot easily be transmitted to the Victim terminal from which the Victim signal is not detected in the CCA, by making the receiving antenna directivity applied when the WPT 10 executes the CCA the same as the transmitting antenna directivity applied when the power supply is executed.

In the following explanations, directivity for transmitting the power (i.e., transmitting antenna directivity) and directivity for executing the CCA (i.e., receiving antenna directivity) are comprehensively called a directivity of the WPT 10.

An example of the procedure of the WPT 10 according to the present embodiment will be explained below with reference to the flowchart of FIG. 16.

Portions different from those in the processing illustrated in FIG. 5 will be mainly explained and detailed explanations of the same portions as those in FIG. 5 will be omitted.

First, the processing in steps S21 and S22 corresponding to the above-explained processing in steps S1 and S2 illustrated in FIG. 5 is executed.

Next, the detection module 101 sets the directivity of the WPT 10 (step S23). The directivity of the WPT 10 set in step S23 may be preset or may be based on the position of the power receiving device, etc. The information such as the position of the power receiving device, etc., (i.e., the information on the power receiving device) may be received from the power receiving device via the communication device 15 illustrated in FIG. 3 explained above.

When the processing in step S23 is executed, the processing in steps S24 to S27 corresponding to the above-explained processing in steps S3 to S6 illustrated in FIG. 5 is executed.

In step S24, the CCA is executed based on the directivity of the WPT 10 set in step S23 (i.e., the Victim signal is detected under the directivity).

In addition, when the processing in step S25 is executed, the result of the processing (i.e., the result of the CCA) in step S25 is stored in the storage 103 as the history information, similarly to the above-described second embodiment. The history information of the present embodiment includes, for example, information on the directivity of the WPT 10 at the time when the Victim signal is detected.

In addition, when the power supply is executed in step S26, the power transmission module 102 transmits the power supply signal, based on the directivity of the WPT 10 set in step S23.

If it is determined that the Victim signal power is larger than or equal to the CCA threshold value in step S25, the flow returns to step S23 and the processing is repeated. In this case, the control module 104 controls (resets) the directivity of the WPT 10, based on the history information stored in the storage 103 explained above. In this case, the control module 104 executes the control to change the current directivity of the WPT 10 to the other directivity. The other directivity may be, for example, one of a plurality of directivities that the WPT 10 has preliminarily. Alternatively, the control module 104 may execute the control to change the current directivity to the directivity in which the Victim signal is not detected in the previous CCA. Alternatively, if the WPT 10 includes an array antenna, the WPT 10 may form a new directivity by controlling at least one of the phase and amplitude of the array element.

In addition, if it is determined that the power supply may not be ended in step S27, the flow returns to step S24 and the processing is repeated.

According to the above processing illustrated in FIG. 16, the CCA is executed based on the set directivity of the WPT 10 and, if the Victim signal is not detected at the CCA, the power supply is executed based on the directivity. In contrast, if the Victim signal is detected in the CCA, the set directivity is changed and the CCA is executed again.

In the present embodiment, as described above, the result of executing the CCA is stored in the storage 103 as the history information, and the directivity for transmitting the power (i.e., directivity of the electromagnetic waves) is controlled, based on the history information stored in the storage 103. In addition, in the present embodiment, the directivity for transmitting the power is the same as the directivity for executing the CCA (i.e., directivity for carrier sense).

According to such a configuration, influence on the Victim can be reduced since the power supply signal of the WPT 10 can be transmitted in a direction other than the direction in which, for example, the Victim signal is detected previously. In other words, when the Victim signal is detected in the previous CCA, it can be estimated that the probability of exerting an influence on the Victim with the same directivity will be high and, therefore, the interference can be suppressed by executing the control of changing the directivity of the WPT 10.

In addition, in the present embodiment, for example, the CCA may be executed at a plurality of times while switching (changing) the directivity of the WPT 10. More specifically, for example, the CCA is first executed with a comparatively wide directivity (beam pattern), the CCA is next executed with a comparatively narrow directivity (beam pattern) and, if the Victim signal cannot be detected in any one of the CCA, the power supply can be executed.

In general, signals can be detected within a wider range, at a wider beam pattern, but the power supply efficiency is lowered. In contrast, a range in which signals can be detected becomes narrower, at a narrower beam pattern, but the power supply efficiency is improved. For this reason, compatibility between the detection area and the power supply efficiency can be obtained by switching a wider beam pattern and a narrower beam pattern and executing the CCA.

In such a configuration, for example, if the Victim signal is not detected at a wider beam pattern but detected at a narrower beam pattern, the CCA may be executed again by changing the direction of the narrower beam pattern (i.e., directivity of the WPT 10) or the CCA may be executed again after lowering the transmission power of the WPT 10 and making the CCA threshold value larger. In contrast, if the Victim signal is detected at a wider beam pattern, the CCA may be executed again by changing the direction of the wider beam pattern (i.e., directivity of the WPT 10) or the CCA may be executed again at the wider beam pattern after lowering the transmission power of the WPT 10 and making the CCA threshold value larger.

In addition, in the present embodiment, controlling the directivity of the WPT 10 has been explained, but the radiant power of the WPT 10 at transmission of the power (i.e., radiant power of electromagnetic waves) may be controlled. The radiant power corresponds to, for example, a sum of an antenna gain and the transmission power of the WPT 10. That is, in the present embodiment, not only the directivity of the WPT 10, but the transmission power of the WPT 10 may be controlled simultaneously. Furthermore, in the present embodiment, one of the directivity and transmission power of the WPT 10 may be controlled adaptively (selectively).

An example of the procedure of the WPT 10 when controlling the radiant power (directivity and transmitted power) of the WPT 10 will be explained below with reference to the flowchart of FIG. 17.

Portions different from those in FIG. 16 will be mainly explained and detailed explanations of the same portions as those in FIG. 16 will be omitted.

First, the processing in steps S31 to S35 corresponding to the processing in steps S21 to S25 illustrated in FIG. 16 is executed.

Next, if it is determined that the Victim signal power is not larger than or equal to the CCA threshold value in step S35 (NO in step S35), the processing in steps S38 and S39 corresponding to the processing in steps S26 and S27 illustrated in FIG. 16 is executed.

In contrast, if it is determined that the Victim signal power is larger than or equal to the CCA threshold value (YES in step S35), the detection module 101 determines whether the Victim signal power is larger than or equal to a value obtained by adding a predetermined offset value to the CCA threshold value (i.e., CCA threshold value+offset value) or not (step S36).

If it is determined that the Victim signal power is larger than or equal to the CCA threshold value+offset value (YES in step S36), the flow returns to step S33 and the processing is repeated. In this case, in step S33, control to change the current directivity of the WPT 10 to the other directivity is executed. As explained above, the other directivity may be, for example, one of a plurality of directivities that the WPT 10 has preliminarily. Alternatively, the control module 104 may execute the control to change the current directivity to the directivity in which the Victim signal is not detected in the previous CCA. Alternatively, if the WPT 10 includes an array antenna, the WPT 10 may form a new directivity by controlling at least one of the phase and amplitude of the array element.

If it is determined that the Victim signal power is not larger than or equal to the CCA threshold value+offset value (NO in step S36), the control module 104 changes the transmission power of the WPT 10 (step S37). In this case, the control module 104 executes control of lowering the transmission power of the WPT 10 below the transmission power set in step S31 such that the CCA threshold value used in step S35 or S36 exceeds the Victim signal power.

When the processing in step S37 is executed, the above-explained processing in steps S38 and S39 is executed.

If it is determined that the power supply may not be ended in step S39, the flow returns to step S34 and the processing is repeated.

The Victim (Victim signal) is detected according to the mask pattern of the CCA threshold value at the CCA as explained in the above first embodiment but, if the power level of the detected Victim signal (Victim signal power) slightly exceeds the CCA threshold value, the CCA threshold value (mask pattern) can be satisfied by lowering the transmission power of the WPT 10 to the extent of exceeding. In such a case, it is more effective to change (control) the transmission power of the WPT 10 instead of changing the directivity in which the power transmission pattern is changed largely.

In the above processing illustrated in FIG. 17, considering the above matter, when the Victim transmission power is not larger than or equal to the CCA threshold value+offset value, interference on the Victim is suppressed by controlling the transmission power of the WPT 10, without changing the directivity and largely changing the power transmission pattern.

Furthermore, in the present embodiment, a plurality of mask patterns of the CCA threshold value can be set and the directivity or transmission power of the WPT 10 can be controlled in accordance with a relationship between the Victim signal power and the mask patterns.

Figure 18:
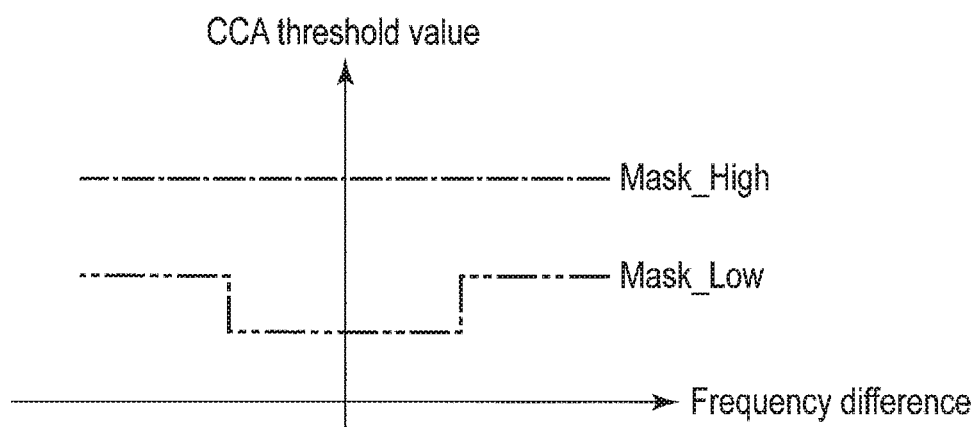
FIG. 18 is a chart illustrating an example of Mask_Low and Mask_High set as mask patterns of CCA threshold value.

More specifically, Mask_Low and Mask_High are set as mask patterns of the CCA threshold values as illustrated in FIG. 18. In the example illustrated in FIG. 18, the mask pattern of the second CCA threshold value explained in the above first embodiment (i.e., the threshold value set to exert no influence on the communication property of the Victim) is set as Mask_Low. In addition, the mask pattern of the third CCA threshold value explained in the above first embodiment (i.e., the threshold value set to exert no influence on the performance of the analog circuit provided in the Victim) is set as Mask_High.

An example of a procedure of the WPT 10 in a case where Mask_Low and Mask_High are set as mask patterns of CCA threshold value as mentioned above will be explained with reference to a flowchart of FIG. 19.

Portions different from those in the processing illustrated in FIG. 16 will be mainly explained and detailed explanations of the same portions as those in FIG. 16 will be omitted.

First, the processing in steps S41 to S44 corresponding to the processing in steps S21 to S24 illustrated in FIG. 16 is executed.

Next, the detection module 101 determines whether the Victim signal power is larger than or equal to a CCA threshold value (hereinafter simply referred to as Mask_High) specified by Mask_High, based on the frequency difference between the WPT 10 and the Victim, or not (step S45). In the example illustrated in FIG. 18, since Mask_High is a mask pattern of the third CCA threshold value, Mask_High used in step S45 is a constant value irrespective of the frequency difference.

If it is determined that the Victim signal power is larger than or equal to Mask_High (YES in step S45), the flow returns to step S43 and the processing is repeated. In this case, in step S43, control to change the current directivity of the WPT 10 to the other directivity is executed.

In contrast, if it is determined that the Victim signal power is not larger than or equal to Mask_High (NO in step S45), the detection module 101 determines whether the Victim signal power is larger than or equal to a CCA threshold value (hereinafter simply referred to as Mask_Low) specified by Mask_Low, based on the frequency difference between the WPT 10 and the Victim, or not (step S46).

If it is determined that the Victim signal power is larger than or equal to Mask_Low (YES in step S46), the control module 104 changes the transmission power of the WPT 10 (step S47). Since the processing in step S47 corresponds to the processing in step S37 illustrated in FIG. 17, its detailed descriptions are omitted here. When the processing in step S47 is executed, the processing in steps S48 and S49 corresponding to the processing in steps S26 and S27 illustrated in FIG. 16 is executed.

In contrast, if it is determined that the Victim signal power is not larger than or equal to Mask_Low (NO in step S46), the above processing in steps S48 and S49 is executed. If the Victim signal itself is not detected at the CCA, the processing in steps S48 and S49 is also executed.

If it is determined that the power supply may not be ended in step S49, the flow returns to step S44 and the processing is repeated.

Figure 19:
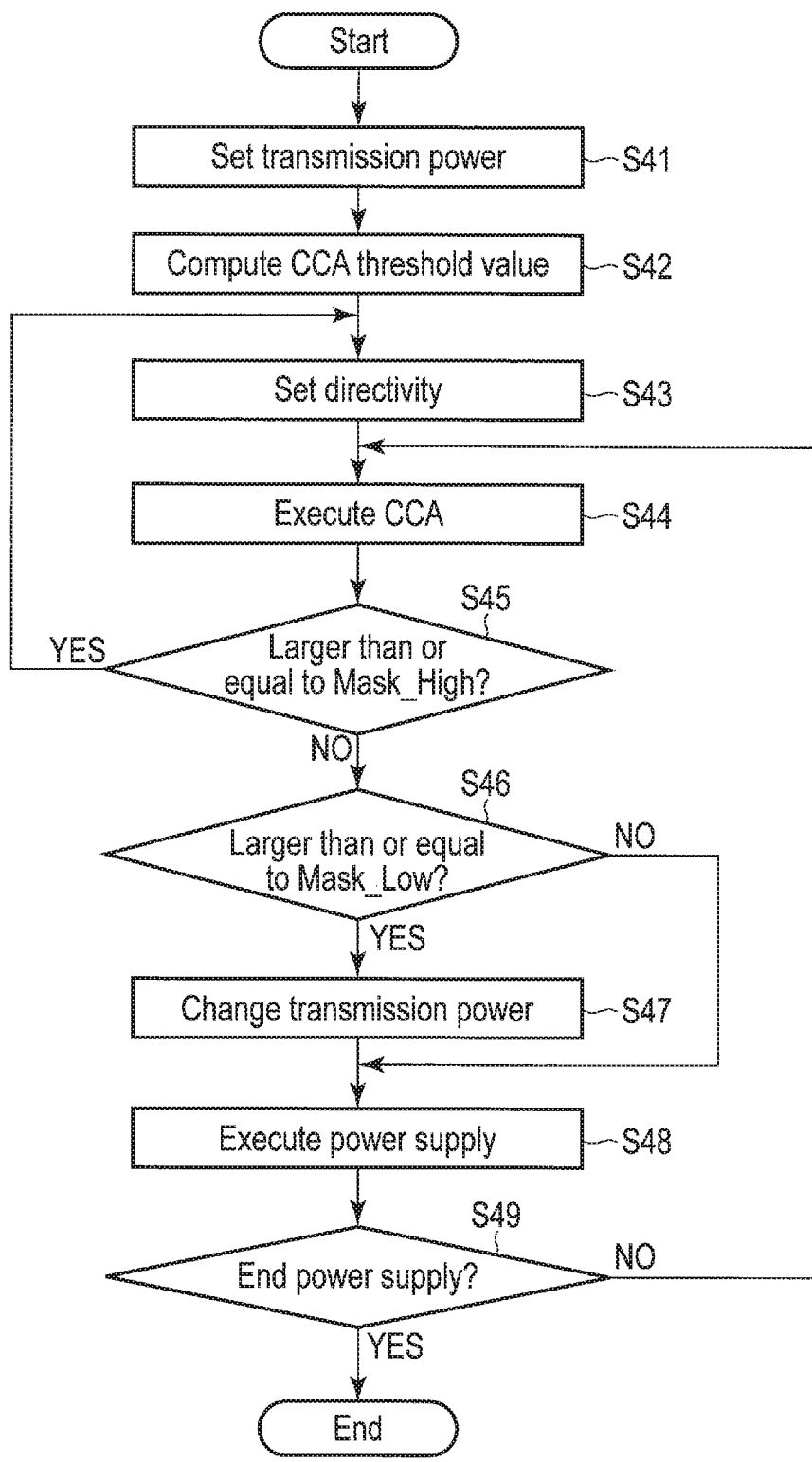
FIG. 19 is a flowchart illustrating an example of a procedure of WPT in a case where Mask_Low and Mask_High are set as mask patterns of CCA threshold value.

According to the above-explained processing illustrated in FIG. 19, if the Victim signal power is not larger than or equal to Mask_Low, it is estimated that the influence is hardly exerted on the Victim, and the power supply is executed. In contrast, if the Victim signal power is larger than or equal to Mask_Low and is not larger than or equal to Mask_High (i.e., between Mask_Low and Mask_High), it is estimated that interference on Victim is limited, and the power supply is executed after changing (controlling) the transmission power of the WPT 10. In addition, if the Victim signal power is larger than or equal to Mask_High, it is estimated that the influence exerted on the Victim is large (serious), the power supplied is not executed, and the directivity is changed (controlled).

According to the processing illustrated in FIG. 19, compatibility between suppression of the interference on the Victim and the power supply efficiency can be obtained by executing the control varied in accordance with the level of the mask patterns to which the Victim signal power corresponds, as explained above.

In FIG. 19, the transmission power of the WPT 10 is changed if it is determined that the Victim signal power is larger than or equal to Mask_Low but, if the Victim signal power is larger than or equal to Mask_Low, the directivity may be changed similarly to the case where the Victim signal power is larger than or equal to Mask_High.

In addition, even if the Victim signal power is larger than or equal to Mask_High, the transmission power of the WPT 10 may be changed when, for example, a difference between the Victim signal power and Mask_High is small.

Furthermore, in the present embodiment, the power supply period may be controlled in addition to the above-explained directivity and transmission power of the WPT 10.

An example of the procedure of the WPT 10 when controlling the power supply period in addition to the directivity and the transmission power of the WPT 10 as explained above will be explained below with reference to the flowchart of FIG. 20.

Portions different from those in the above-explained processing illustrated in FIG. 19 will be mainly explained and detailed explanations of the same portions as those in FIG. 19 will be omitted.

First, the processing in steps S51 to S56 corresponding to the processing in steps S41 to S46 illustrated in FIG. 19 is executed.

Next, if it is determined that the Victim signal power is larger than or equal to Mask_Low in step S56 (YES in step S56), the control module 104 determines whether the transmission power of the WPT 10 is to be changed or not (step S57). In step S57, for example, the determination is executed in accordance with the difference between the Victim signal power and Mask_Low. More specifically, if the difference between the Victim signal power and Mask_Low is smaller than a predetermined value, it can be determined that the transmission power of the WPT 10 is to be changed since the Victim signal power can be made to be smaller than or equal to Mask_Low by changing the transmission power. In contrast, if the difference between the Victim signal power and Mask_Low is larger than a predetermined value, it is determined that the transmission power of the WPT 10 is not to be changed (i.e., the power supply period is to be changed).

If it is determined that the transmission power of the WPT 10 may be changed (YES in step S57), the control module 104 changes the transmission power of the WPT 10 (step S58). Since the processing in step S58 corresponds to the processing in step S47 illustrated in FIG. 19 explained above (i.e., step S37 illustrated in FIG. 17), its detailed descriptions are omitted here.

In contrast, if it is determined that the transmission power of the WPT 10 may not be changed (NO in step S57), the control module 104 changes the power supply period (step S59). In this case, to reduce the probability of exerting an influence on the Victim, the control module 104 changes the current power supply period (for example, the initial value of the power supply period) to a shorter power supply period.

When the above-explained processing in step S58 or S59 is executed, the processing in steps S60 and S61 corresponding to the processing in steps S48 and S49 illustrated in FIG. 19 is executed.

In contrast, if it is determined that the Victim signal power is not larger than or equal to Mask_Low in step S56 (NO in step S56), the processing in steps S60 and S61 is executed.

If it is determined that the power supply may not be ended in step S61, the flow returns to step S54 and the processing is repeated.

Figure 20:
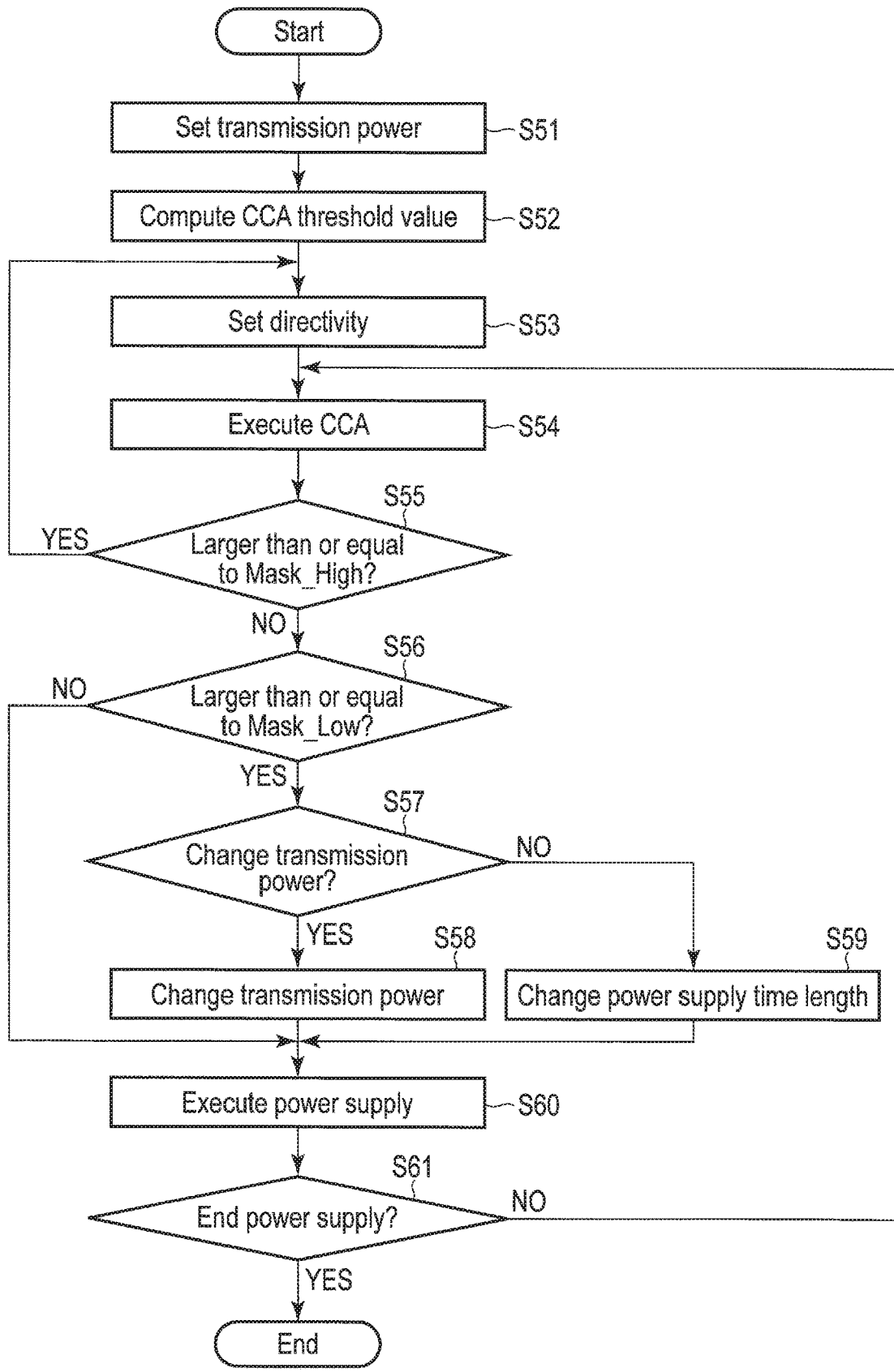
FIG. 20 is a flowchart illustrating an example of a procedure of WPT when controlling a power supply period in addition to directivity of WPT and transmission power.

The compatibility between the suppression of interference on the Victim and the power supply efficiency can be obtained even in a configuration of controlling not only the directivity and the transmission power of the WPT 10, but also the power supply period, as illustrated in FIG. 20.

In FIG. 20, the transmission power or the power supply period of the WPT 10 is changed if it is determined that the Victim signal power is larger than or equal to Mask_Low but, if the Victim signal power is larger than or equal to Mask_Low, the directivity may be changed similarly to the case where the Victim signal power is larger than or equal to Mask_High.

In addition, even if the Victim signal power is larger than or equal to Mask_High, the transmission power or the power supply period of the WPT 10 may be changed when, for example, a difference between the Victim signal power and Mask_High is small.

Controlling the power supply period has been explained with reference to FIG. 20, but the CCA period may be controlled instead of the power supply period or together with the power supply period.

In the present embodiment, controlling the directivity of the WPT 10 (directivity of the electromagnetic waves) based on the history information stored in the storage 103 has been mainly explained, but the control may be executed based on, for example, the information on the power receiving device received by executing wireless communication with the power receiving device via the communication device 15 illustrated in FIG. 3.

The information received from the power receiving device includes, for example, information such as the power quantity required by the power receiving device, the distance from the power receiving device, and the direction and position of the power receiving device. Alternatively, commands of start and stop of the power supply, and the like may be received from the power receiving device.

Wireless communication with the power receiving device may be executed at an arbitrary time independent of the CCA and the power supply at the WPT 10 or may be executed periodically. Alternatively, the wireless communication may be executed simultaneously with the CCA or executed after the power supply time is ended.

In the WPT 10 according to the present embodiment, the directivity, transmission power, radiant power or the like of (the electromagnetic waves out from) the WPT 10 may be controlled by using the information.

In addition, the transmission power and the directivity of the WPT 10 are set before the CCA is executed in FIG. 16, FIG. 17, FIG. 19, FIG. 20 and the like explained in the present embodiment, but these settings may be executed every time the information on the power receiving device is received from the power receiving device. In addition, these settings may be periodically executed independently of the communication with the power receiving device.

The WPT 10 according to the present embodiment may be implemented in combination with the configuration (control) explained in the above second embodiment and the like.

That is, the WPT 10 according to the present embodiment may be configured to include the directivity forming function and to be able to implement compatibility between the suppression of interference on the Victim and wireless power supply by controlling the directivity, the transmission power, the power supply period, or the CCA period of the WPT 10 based on the history information (result of the CCA) stored by the storage 103, information on the power receiving device, and the like.

Fourth Embodiment

Next, a fourth embodiment will be described. In the present embodiment, the same portions as those in the drawings used in the explanations of the first to third embodiments are denoted by the same reference numerals and then explained. In the following explanations, different portions from the first to third embodiments will be mainly explained. A functional configuration of a WPT 10 of the present embodiment is assumed to be the same as the functional configurations of the above-described second and third embodiments.

Executing the CCA to mainly inspect existence of one Victim has been explained in the above first to third embodiments, and the present embodiment is different from the first to third embodiments with respect to a feature that, for example, the CCA is executed (i.e., carrier sense is executed in the second and third frequency bands) to inspect existence of two or more Victims using frequency bands (second and third frequency bands) different from at least the frequency band used by the WPT 10.

According to the frequency band (power transmission frequency) used by the WPT 10, a plurality of different Victims (wireless systems) may exist in a frequency band (near frequency) near the frequency band, and influence on the different Victims needs to be considered.

It is assumed that a plurality of different Victims mentioned above, i.e., first Victim and second Victim exist. If the first Victim is different in type from the second Victim, for example, requirements (orders) on the CCA period and the power supply period that are to be controlled by the WPT 10 may be different in accordance with the wireless communication formats adopted at the first Victim and the second Victim.

FIG. 21 illustrates an example of CCA periods and power supply periods for the first Victim and the second Victim.

In the following explanations, the CCA period and the power supply period for the first Victim are called first CCA period and first power supply period, respectively. In addition, the CCA period and the power supply period for the second Victim are called second CCA period and second power supply period, respectively.

In FIG. 21, the first CCA period and the first power supply period are referred to as "CCA1" and "power supply 1", respectively. In addition, the second CCA period and the second power supply period are referred to as "CCA2" and "power supply 2", respectively. The above elements are the same in the following drawings.

In FIG. 21, it is illustrated that the first CCA period is 10 µs (order) and the first power supply period is 1 ms (order). In contrast, it is illustrated that the second CCA period is 1 ms (order) and the second power supply period is 10 ms (order).

Thus, in the first and second Victims, the CCA period and the power supply period often do not match (i.e., mismatch between the CCA period and the power supply period often occurs).

A time necessary to reliably detect the Victim signal needs to be secured as the CCA period in the CCA executed by the WPT 10. For this reason, the CCA period is varied in accordance with the type of assumed Victim.

In addition, the power supply period is desirably approximately the same as the time in which the Victim occupies the channel in the wireless communication executed at the Victim. For this reason, the power supply period is also varied in accordance with the type of assumed Victim.

The CCA period and the power supply period can be controlled as explained in the above second embodiment and the like but, if control of the CCA period and the power supply period for a plurality of Victims (first and second Victims) is executed simultaneously, differences between the CCA period and the power supply period need to be considered.

An example of the procedure of the WPT 10 according to the present embodiment will be explained below with reference to the flowchart of FIG. 22.

Portions different from those in the processing illustrated in FIG. 12 will be mainly explained and detailed explanations of the same portions as those in FIG. 12 will be omitted.

First, the processing in steps S71 to S75 corresponding to the above-explained processing in steps S11 to S15 illustrated in FIG. 12 is executed.

In the present embodiment, it is assumed that the first and second Victims exist as explained above, and the CCA threshold value (mask pattern) is varied in accordance with the Victim (transmission power of the Victim terminal, and the like) as explained in the above first embodiment. For this reason, the processing in step S72 is executed at each Victim, and each of the CCA threshold value for the first Victim and the CCA threshold value for the second Victim is computed.

In addition, the processing in steps S74 and S75 is also executed at each Victim. That is, when the processing in steps S74 and S75 is executed, the first CCA period and the first power supply period are computed, and the second CCA period and the second power supply period are computed.

The CCA period and the power supply period for each of the first and second Victims are computed based on the history information in FIG. 22, but the CCA period and the power supply period may be obtained without using the history information. That is, the CCA period and the power supply period for each of the first and second Victims may be, for example, predetermined or may be computed from the other information.

Next, the control module 104 determines the CCA period in the CCA executed at the WPT 10 and the power supply period (hereinafter referred to as the CCA period and the power supply period at the WPT 10), based on the first CCA period, the first power supply period, the second CCA period, and the second power supply period computed in steps S74 and S75 (step S76). In this case, the control module 104 compares, for example, sequentially executing the CCA and the power supply based on the first CCA period and the first power supply period with sequentially executing the CCA and the power supply based on the second CCA period and the second power supply period, and determines the CCA period and the power supply period at the WPT 10 such that the power supply is executed in a time band when the power supply times match. Concrete examples of the CCA period and the power supply period at the WPT 10 determined in step S76 will be explained later.

When the processing in step S76 is executed, the processing in steps S77 to S80 corresponding to the processing in steps S16 to S19 illustrated in FIG. 12 is executed.

In step S77, the CCA is executed during the CCA period at the WPT 10 as determined in step S76. In addition, in the CCA executed in step S77, both of the wireless signal transmitted at the first Victim (hereinafter referred to as first Victim signal) and the wireless signal transmitted at the second Victim (hereinafter referred to as second Victim signal) can be detected. In other words, in step S77, the CCA for the first Victim and the CCA for the second Victim are executed simultaneously.

In addition, in step S78, it is determined whether at least one of the power level of the first Victim signal (hereinafter referred to as a first Victim signal power) and the power level of the second Victim signal (hereinafter referred to as a second Victim signal power), which are detected in the CCA, is larger than or equal to the CCA threshold value or not.

As the CCA threshold value (mask pattern) used in step S78, for example, the CCA threshold value having a stricter value, of the CCA threshold value for the first Victim and the CCA threshold value for the second Victim, can be used. If the frequency band used by the first Victim is different from the frequency band used by the second Victim, different CCA threshold values may be used in accordance with the frequency bands (i.e., the detected Victim signals).

If it is determined that at least one of the first and second Victim signal powers is larger than or equal to the CCA threshold value in step S78, the flow returns to step S73 and the processing is repeated in a state in which the result of the CCA is stored in the storage 103. In this case, the processing in step S77 may be executed again while maintaining the CCA period determined in step S76. Alternatively, the transmission power and the antenna directivity may be changed as explained in the third embodiment.

In addition, in step S79, the power supply is executed during the power supply period at the WPT 10 as determined in step S76.

In addition, if it is determined that the power supply may not be ended in step S80, the flow returns to step S77 and the processing is repeated. In this case, the flow may return to step S73 and the processing may be repeated.

The CCA periods and power supply periods at the WPT 10 will be explained concretely with reference to FIG. 23.

Figure 23:
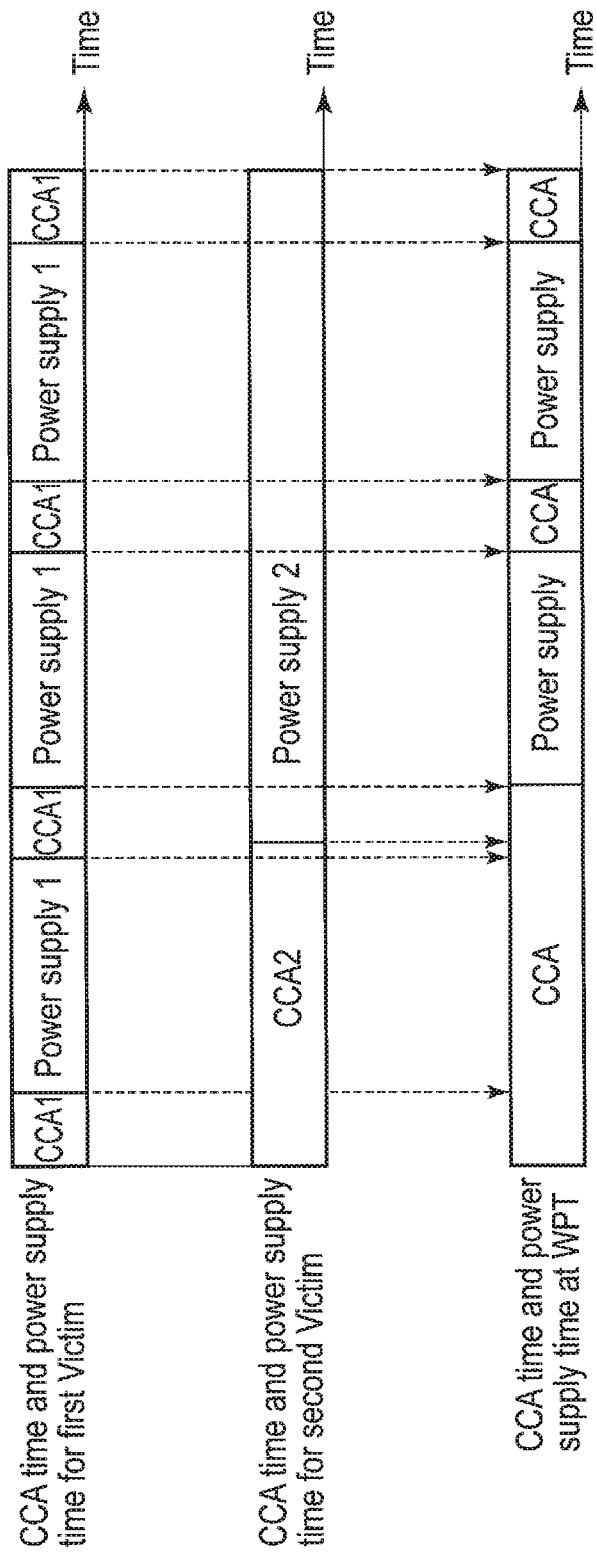
FIG. 23 is a chart specifically illustrating CCA periods and power supply periods in WPT.

The CCA periods (first CCA period and second CCA period) and the power supply periods (first power supply period and second power supply period) computed independently for the first Victim and the second Victim are illustrated in FIG. 23 but, in the present embodiment, the time band in which the first power supply period and the second power supply period match is determined as the power supply period at the WPT 10.

The CCA period at the WPT 10 in this case is allocated to a time band other than the power supply period at the WPT 10 determined as explained above.

As explained above, in the present embodiment, the CCA to detect presence or absence of the Victim signals at a plurality of Victims (first Victim and second Victim) is executed. The CCA period and the power supply period at the WPT 10 are determined based on the CCA period and the power supply period (first CCA period and first power supply period) computed for the first Victim and the CCA period and the power supply period (second CCA period and second power supply period) computed for the second Victim.

In the present embodiment, having such a configuration, the power supply can be executed while securing the CCA time for each of the first and second Victims and, therefore, even if a plurality of different Victims exist, coexistence with the WPT 10 can be attempted.

In the present embodiment, the detection of the first Victim signal and the detection of the second Victim signal, at the WPT 10, may be implemented by different signal detection mechanisms or may be implemented by the same signal detection mechanism.

In addition, if the detections are implemented by the same signal detection mechanism, for example, the wireless signal is received in a wide band including both of the frequency band (signal band) used by the first Victim and the frequency band (signal band) used by the second Victim, the wireless signal is frequency-analyzed, and it can be thereby discriminated whether the first Victim signal or the second Victim signal is included in the wireless signal. In addition, the first Victim signal and the second Victim signal may be discriminated by executing the demodulation of the received wireless signal. Furthermore, if the types (wireless communication formats and the like) of the first Victim and the second Victim are preliminarily discriminated, the first Victim signal and the second Victim signal may be discriminated based on, for example, the size of the power level of the received wireless signal, the duration of a section of a high power level in the wireless signal, and the like.

For example, the WPT 10 according to the present embodiment may be configured to determine the CCA period and the power supply period every time the CCA and the power supply are changed.

An example of the procedure of the WPT 10 when determining the CCA period and the power supply period every time the CCA and the power supply are changed will be explained with reference to a flowchart of FIG. 24.

Portions different from those in FIG. 22 will be mainly explained and detailed explanations of the same portions as those in FIG. 22 will be omitted.

First, the processing in steps S91 to S95 corresponding to the processing in steps S71 to S75 illustrated in FIG. 22 is executed.

Next, the control module 104 compares the first CCA period and the second CCA period computed in step S94, and determines whether the first CCA period is longer than the second CCA period or not (step S96).

If it is determined that the first CCA period is longer than the second CCA period (YES in step S96), the control module 104 determines the first CCA period as the CCA period at the WPT 10. In this case, the detection module 101 executes the CCA during the first CCA period (step S97).

In contrast, if it is determined that the first CCA period is not longer than the second CCA period (i.e., the first CCA period is shorter than the second CCA period) (NO in step S96), the control module 104 determines the second CCA period as the CCA period at the WPT 10. In this case, the detection module 101 executes the CCA during the second CCA period (step S98).

When the processing in step S97 or S98 is executed, the processing in step S99 corresponding to the processing in step S78 illustrated in FIG. 22 is executed.

If it is determined that at least one of the first Victim signal power and the second Victim signal power is larger than or equal to the CCA threshold value in step S99, the flow returns to step S93 and the processing is repeated. In this case, the processing in step S97 or step S98 may be executed again while maintaining the CCA period determined by the control module 104.

If it is determined that both of the first and second Victim signal powers are not larger than or equal to the CCA threshold value in step S99, the control module 104 compares the first power supply period and the second power supply period computed in step S95 and determines whether the first power supply period is shorter than the second power supply period or not (step S100).

If it is determined that the first power supply period is shorter than the second power supply period (YES in step S96), the control module 104 determines the first power supply period as the power supply period at the WPT 10. In this case, the power transmission module 102 executes the power supply during the first power supply period (step S101).

If it is determined that the first power supply period is not shorter than the second power supply period (i.e., the first power supply period is longer than the second power supply period) (NO in step S100), the control module 104 determines the second power supply period as the power supply period at the WPT 10. In this case, the detection module 101 executes the power supply during the second power supply period (step S102).

When the processing in step S101 or S102 is executed, the processing in step S103 corresponding to the processing in step S80 illustrated in FIG. 22 is executed. If it is determined that the power supply may not be ended in step S103, the flow returns to step S96 and the processing is repeated.

Figure 24:
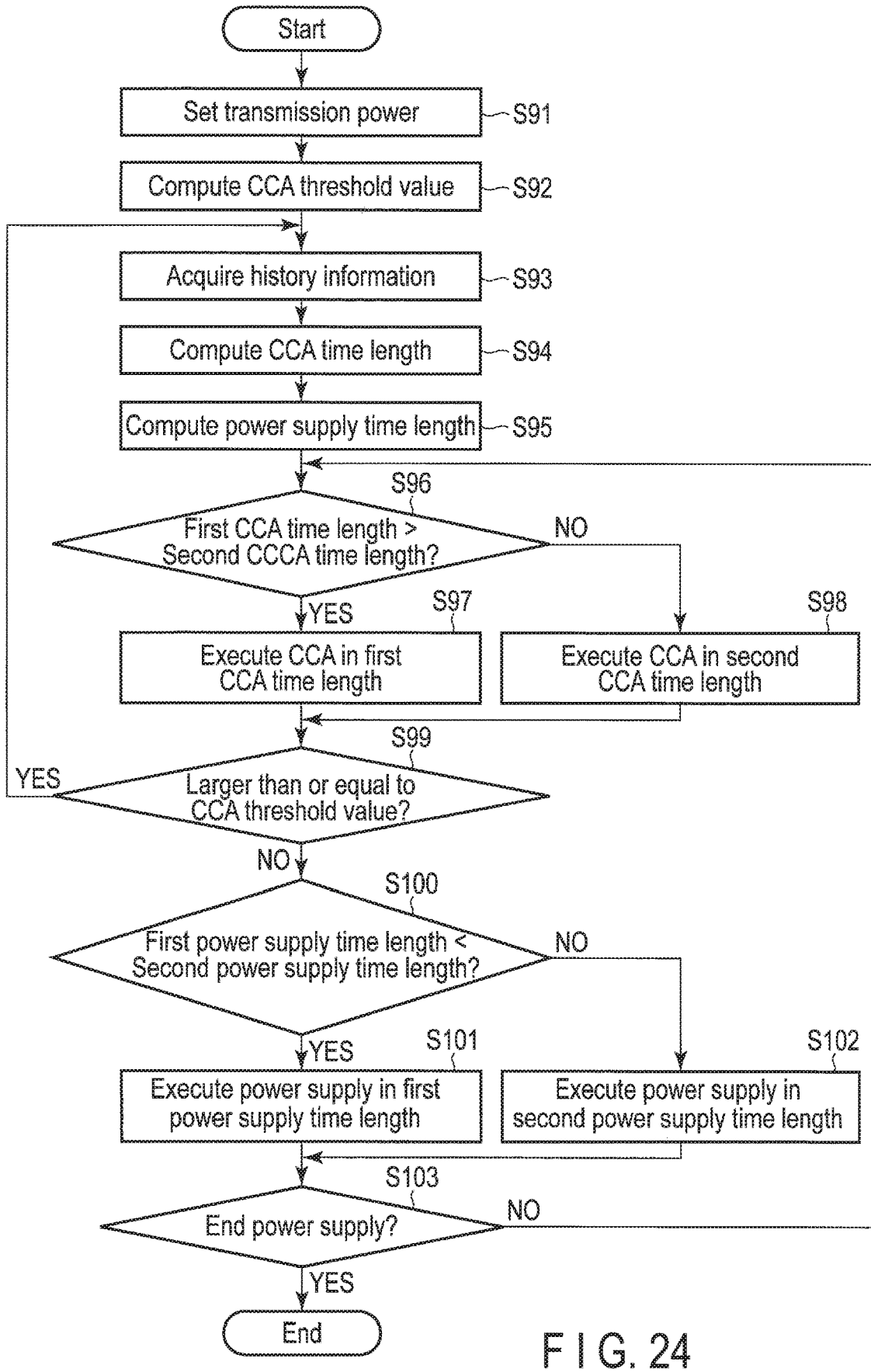
FIG. 24 is a flowchart illustrating an example of a procedure of WPT when determining a CCA period and a power supply period every time CCA and power supply are changed.

According to the above processing illustrated in FIG. 24, concerning the CCA, the first CCA period and the second CCA period are compared and the CCA is executed while adopting the CCA period having a longer time. In contrast, as regards the power supply, the first power supply period and the second power supply period are compared and the power supply is executed while adopting the power supply period having a shorter time.

The probability to exert an influence on a plurality of Victims by the power supply can be reduced while reliably securing the CCA period for the Victims, by executing the above control.

In the present embodiment, executing the CCA commonly to the first and second Victims has been explained but, for example, the CCA for the first Victim and the CCA for the second Victim may be executed in different time bands.

More specifically, for example, if the second power supply period (i.e., the power supply period computed for the second Victim) is much longer than the first power supply period (i.e., the power supply period computed for the first Victim), the CCA for the first Victim may be executed within the second power supply period.

Preforming the CCA for the first Victim within a range of the second power supply period will be explained concretely with reference to FIG. 25.

The first CCA period referred to as "CCA1" and the first power supply period referred to as "power supply 1" in FIG.

25 are assumed to be computed as the CCA period and the power supply period for the first Victim.

In addition, the second CCA period referred to as "CCA2" and the second power supply period referred to as "power supply 2" in FIG. 25 are assumed to be computed as the CCA period and the power supply period for the second Victim.

In this case, first, the WPT 10 (detection module 101) executes the CCA for the second Victim in, for example, the second CCA period that is longer in time. In the present embodiment, the CCA for the second Victim is indicative of detecting the second Victim signal by using the CCA threshold value for the second Victim.

If the second Victim signal is not detected at the CCA for the second Victim (i.e., it is determined that the power supply can be executed), the power supply in the first power supply period and the CCA for the first Victim in the first CCA period are repeated in the second power supply period. The CCA for the first Victim is indicative of detecting the first Victim signal by using the CCA threshold value for the first Victim.

In the example illustrated in FIG. 25, the power supply and the CCA for the first Victim are repeated but, for example, the first CCA period of the CCA to be executed later and the first power supply period of the power supply executed after the CCA may be controlled (changed), based on the result of the repeated CCA for the first Victim.

If the second power supply period has passed by repeating the power supply and the CCA for the first Victim, the CCA for the second Victim is executed again during the second CCA period.

If the second Victim signal is detected at the CCA for the second Victim, the CCA for the second Victim is executed again. In addition, if the first Victim signal is detected at the CCA for the first Victim, the CCA for the first Victim is executed again.

In addition, according to the wireless system, for example, time restriction for actually transmitting the wireless signal after acquiring an access right by the CCA is often strict. If the WPT 10 controls the CCA periods and the power supply periods for a plurality of Victims, the CCA before power supply needs to be executed for the Victim of the strict time restriction.

Figure 26:
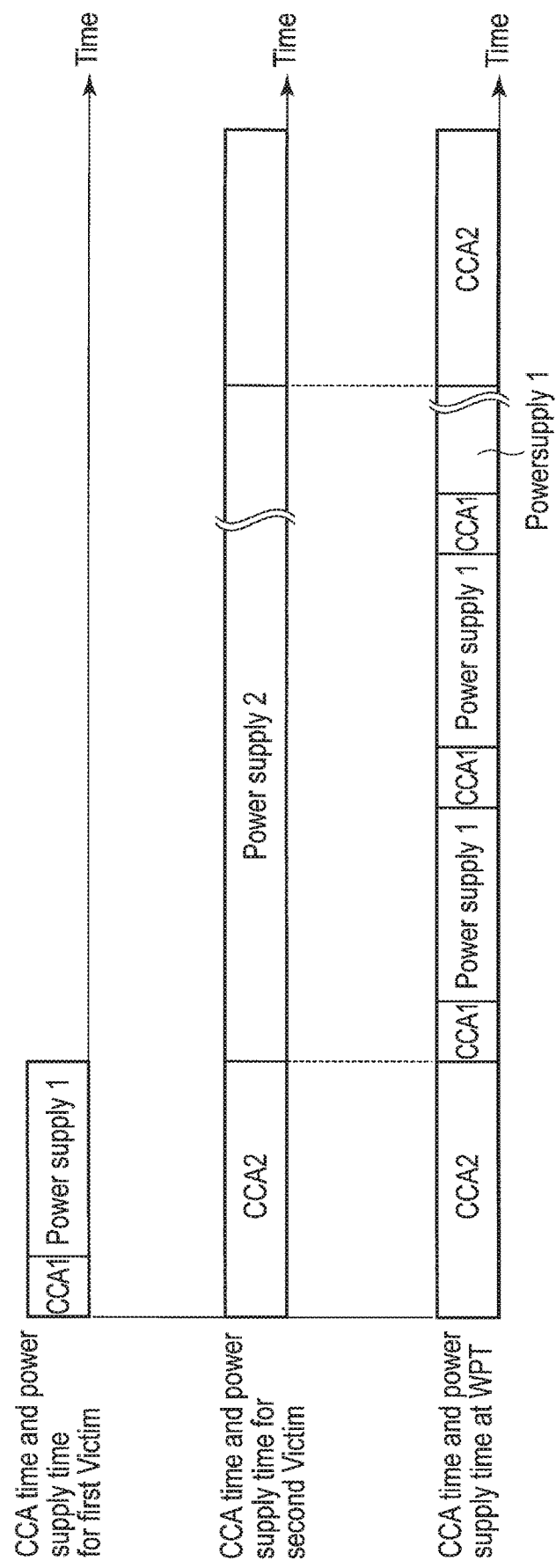
FIG. 26 is a chart illustrating yet another example of control for CCA periods and power supply periods.

For this reason, for example, if the first Victim is stricter in time restriction than the second Victim, the time band in which the power supply is executed may be replaced with the time band in which the CCA for the first Victim is executed during the second power supply period in FIG. 25, as illustrated in, for example, FIG. 26. According to this, the CCA executed before the power supply can be set as the CCA for the first Victim at any time.

In addition, in the example illustrated in, for example, FIG. 25, the CCA period and the power supply period for the first Victim are shorter than the CCA period and the power supply period for the second Victim, but the control may be executed in accordance with the first Victim of shorter periods.

Figure 27:
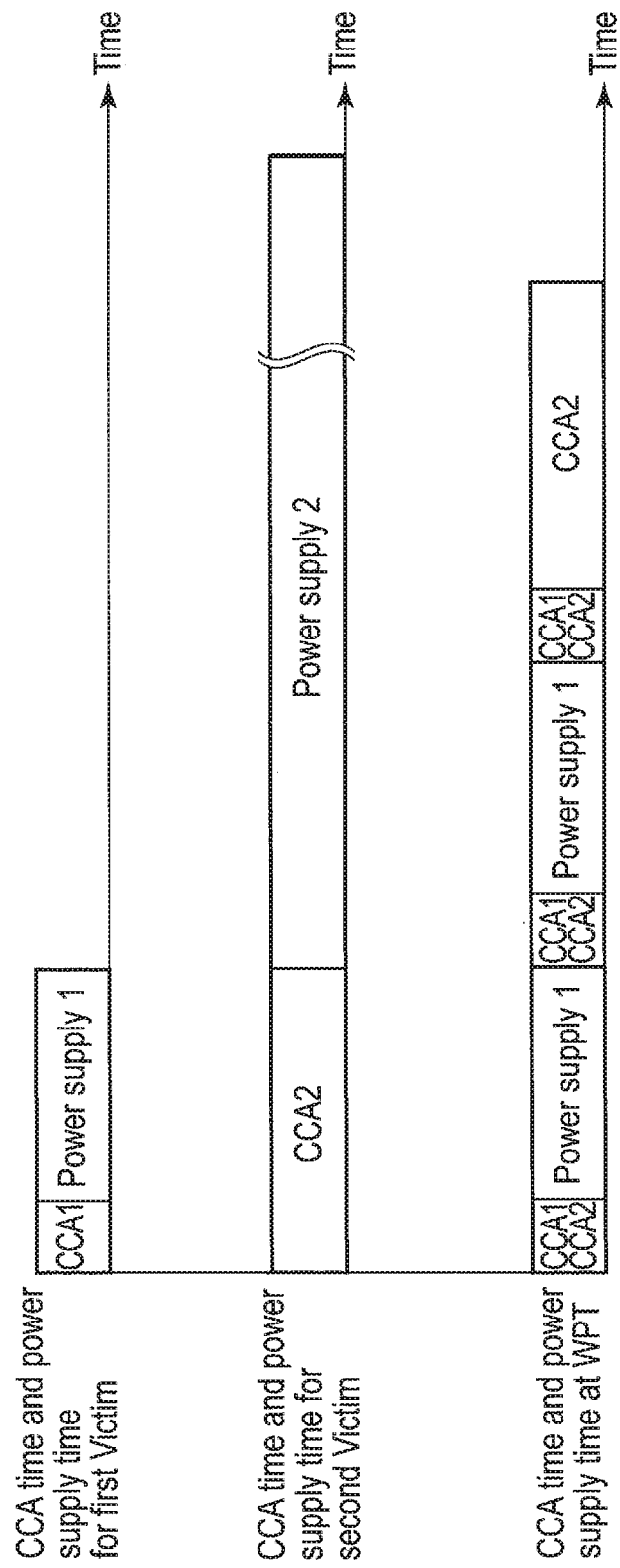
FIG. 27 is a chart illustrating yet another example of control for CCA periods and power supply periods.

In such a configuration, the WPT 10 executes the CCA in the first CCA period as illustrated in FIG. 27. The CCA in this case is CCA executed commonly to the first and second Victims. That is, parts of FIG. 27 where "CCA1" and "CCA2" are illustrated indicate that the CCA for the first Victim and the CCA for the second Victim are executed simultaneously during the first CCA period.

If none of the first Victim signal and the second Victim signal is detected in the CCA, the power supply is executed for the first power supply period of short order. After the power supply is executed, the CCA (CCA for the first Victim and CCA for the second Victim) is executed again for the first CCA period.

Since the first CCA period is shorter than the second CCA period, the CCA may not be able to be executed (i.e., the second Victim signal may not be able to be detected) with adequate accuracy for the second Victim.

Thus, for example, the CCA for the first CCA period is limited to rough signal detection, and if an arbitrary signal is detected in the CCA, the CCA (CCA for the second Victim) may be executed during the second CCA period. According to such a configuration, presence or absence of the second Victim signal can be certainly detected by extending the period in which the CCA is executed to the second CCA period and executing the CCA (more detailed CCA) for the second Victim. The "detailed CCA" is indicative of, for example, reducing the detection error caused by noise or the like by executing the CCA for a long time, changing the CCA threshold value, or exactly detecting the presence or absence of the Victim signal by the processing such as signal demodulation.

If the second Victim signal is not detected in the CCA for the second Victim, the power supply is executed. In contrast, if the second Victim signal is detected in the CCA for the second Victim, the CCA for the second Victim may be executed again.

The WPT 10 according to the present embodiment may be implemented in combination with the configurations (controls) explained in the above embodiments and the like. More specifically, for example, the first CCA period is substantially the same as the second CCA period at predetermined timing, but the first CCA period may be remarkably different from the second CCA period at different timing.

In such a case, for example, if the first CCA period is substantially the same as the second CCA period, the control explained with reference to FIG. 22 to FIG. 24 and the like may be executed, and if the first CCA period is remarkably different from the second CCA period, the control explained with reference to FIG. 25 to FIG. 27 and the like may be executed, by combination with the configuration that, for example, the CCA period and the power supply period can be changed as explained in the above second embodiment. The case where the CCA period is used has been explained but, for example, the power supply period may be used or both of the CCA period and the power supply period may be used. According to such a configuration, control corresponding to the status at each timing can be implemented.

In the present embodiment, it has been mainly explained that two Victims, first Victim and second Victim exist, but the number of Victims may be three or more.

At least one embodiment described above can provide an electronic apparatus and a method capable of avoiding interference to the other wireless systems.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus, comprising:
   transmission circuitry configured to transmit power with a first electromagnetic wave in a first frequency band, and
   processor circuitry configured to execute a carrier sense during a first period, in at least a second frequency band different from the first frequency band,
   wherein the transmission circuitry is further configured to transmit power with a second electromagnetic wave in the first frequency band in a second period following the first period, if a wireless signal is not detected by the carrier sense during the first period, and
   the processor circuitry is further configured to execute the carrier sense during a third period following the first period in the at least the second frequency band, if the wireless signal is detected by the carrier sense during the first period.

2. The electronic apparatus of claim 1, wherein
   the processor circuitry is further configured to execute the carrier sense in the at least the second frequency band, based on a threshold value set such that the first electromagnetic wave or the second electromagnetic wave exerts no influence on a carrier sense for a wireless communication via the second frequency band.

3. The electronic apparatus of claim 2, wherein
   the threshold value is a value varied in accordance with at least one of a frequency difference between the first frequency band and the second frequency band, and a distance of the electronic apparatus and a wireless communication device.

4. The electronic apparatus of claim 1, wherein
   the processor circuitry is further configured to execute the carrier sense in the at least the second frequency band, based on a threshold value set such that the first electromagnetic wave or the second electromagnetic wave exerts no influence on a communication property for a wireless communication via the second frequency band.

5. The electronic apparatus of claim 1, wherein
   the processor circuitry is further configured to execute the carrier sense in the at least the second frequency band, based on a threshold value set such that the first electromagnetic wave or the second electromagnetic wave exerts no influence on performance of an analog circuit for a wireless communication via the second frequency band.

6. The electronic apparatus of claim 1, further comprising:
   storage configured to store history information at least including a result of the carrier sense in a period prior to the first period, wherein
   the processor circuitry is configured to change at least one of lengths of the first period, the second period, and the third period, based on the history information.

7. The electronic apparatus of claim 6, wherein
   the processor circuitry is configured to execute at least one of:
   (1) if a length of the first period is changed, changing the changed length of the first period again so as to be close to the length of the first period to be changed, when a fourth period has passed after the change of the length of the first period,
   (2) if a length of the second period is changed, changing the changed length of the second period again so as to be close to the length of the second period to be changed, when a fifth period has passed after the change of the length of the second period, and
   (3) if a length of the third period is changed, changing the changed length of the third period again so as to be close to the length of the third period to be changed, when a sixth period has passed after the change of the length of the third period.

8. The electronic apparatus of claim 1, wherein
   the processor circuitry is configured to change directivity of the first electromagnetic wave or the second electromagnetic wave, based on a result of the carrier sense.

9. The electronic apparatus of claim 8, wherein
   the directivity of the first electromagnetic wave or the second electromagnetic wave is the same as directivity of the carrier sense.

10. The electronic apparatus of claim 1, wherein
    the processor circuitry is configured to change radiant power of the first electromagnetic wave or the second electromagnetic wave, based on a result of the carrier sense.

11. The electronic apparatus of claim 1, wherein
    the processor circuitry is configured to change directivity of the first electromagnetic wave or the second electromagnetic wave, based on information on a power receiving device which is a transmission destination of the power.

12. The electronic apparatus of claim 1, wherein
    the processor circuitry is configured to change radiant power of the first electromagnetic wave or the second electromagnetic wave, based on information on a power receiving device which is a transmission destination of the power.

13. The electronic apparatus of claim 1, wherein
    the processor circuitry is configured to execute the carrier sense during the first period, in the second frequency band and a third frequency band different from the first frequency band.

14. The electronic apparatus of claim 1, wherein
    the processor circuitry is configured to execute the carrier sense in the second frequency band and execute the carrier sense in at least a third frequency band different from the first frequency band, and
    a time band for the carrier sense in the second frequency band is different from a time band for the carrier sense in the third frequency band.

15. A method, comprising:
    transmitting power with a first electromagnetic wave in a first frequency band; and
    executing a carrier sense during a first period, in at least a second frequency band different from the first frequency band,
    wherein
    the transmitting comprises transmitting power with a second electromagnetic wave in the first frequency band in a second period following the first period, if a wireless signal is not detected by the carrier sense during the first period, and
    the executing comprises executing the carrier sense during a third period following the first period in the at least the second frequency band, if the wireless signal is detected by the carrier sense during the first period.

* * * * *